United States Patent
Zhang et al.

(10) Patent No.: US 10,484,969 B2
(45) Date of Patent: Nov. 19, 2019

(54) CALL PROCESSING METHOD, CALL SERVER, BASE STATION, AND CALL SYSTEM

(71) Applicant: Huawei Technologies Co., Ltd., Shenzhen (CN)

(72) Inventors: Huimin Zhang, Shenzhen (CN); Kangmin Huang, Shenzhen (CN); Rongdao Yu, Shenzhen (CN); Maosheng Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/166,794

(22) Filed: Oct. 22, 2018

(65) Prior Publication Data
US 2019/0059072 A1 Feb. 21, 2019

Related U.S. Application Data

(63) Continuation of application No. PCT/CN2016/083754, filed on May 27, 2016.

(51) Int. Cl.
*H04W 68/02* (2009.01)
*H04W 4/16* (2009.01)
(Continued)

(52) U.S. Cl.
CPC ....... *H04W 68/025* (2013.01); *H04L 65/1069* (2013.01); *H04L 65/1096* (2013.01);
(Continued)

(58) Field of Classification Search
CPC ........... H04W 68/025; H04W 52/0229; H04W 68/12; H04W 68/005; H04W 4/16;
(Continued)

(56) References Cited

U.S. PATENT DOCUMENTS 9,345,060 B1 * 5/2016 Ramamurthy ........ H04W 76/18
2007/0270191 A1 11/2007 Wang et al.
(Continued)

FOREIGN PATENT DOCUMENTS

CN 1728742 A 2/2006
CN 1984443 A 6/2007
(Continued)

OTHER PUBLICATIONS

Machine Translation and Abstract of Chinese Publication No. CN1728742, Feb. 1, 2006, 29 pages.
(Continued)

*Primary Examiner* — Chuong A Ngo

(74) *Attorney, Agent, or Firm* — Conley Rose, P.C.

(57) ABSTRACT

A call processing method, including receiving a first call request of a calling terminal for a called terminal, triggering a mobility management entity to control a base station to page the called terminal, performing call waiting according to a paging response message when receiving the paging response message from the mobility management entity indicating that the called terminal is a power saving state and cannot be paged by the base station, and establishing a session coupling between the calling terminal and the called terminal according to addressing information of the called terminal when receiving, in a call waiting process, the addressing information of the called terminal from the mobility management entity.

20 Claims, 9 Drawing Sheets

(51) Int. Cl.
*H04L 29/06* (2006.01)
*H04M 3/428* (2006.01)
*H04W 68/00* (2009.01)
*H04W 52/02* (2009.01)
*H04W 68/12* (2009.01)

(52) U.S. Cl.
CPC .......... *H04M 3/4288* (2013.01); *H04W 4/16* (2013.01); *H04W 52/0229* (2013.01); *H04W 68/005* (2013.01); *H04W 68/12* (2013.01); *H04M 2207/185* (2013.01); *Y02D 70/122* (2018.01); *Y02D 70/124* (2018.01); *Y02D 70/126* (2018.01); *Y02D 70/20* (2018.01)

(58) Field of Classification Search
CPC .......... H04M 3/4288; H04M 2207/185; H04L 65/1096; H04L 65/1069; Y02D 70/122; Y02D 70/124; Y02D 70/20; Y02D 70/126
See application file for complete search history.

(56) References Cited

U.S. PATENT DOCUMENTS

| | | | |
|---|---|---|---|
| 2010/0015964 | A1 | 1/2010 | An |
| 2011/0110331 | A1* | 5/2011 | Keller ................. H04L 65/1016 370/331 |
| 2013/0252595 | A1* | 9/2013 | Mairs ...................... H04L 67/14 455/415 |
| 2014/0198708 | A1 | 7/2014 | Lee et al. |

FOREIGN PATENT DOCUMENTS

| | | |
|---|---|---|
| CN | 101076160 A | 11/2007 |
| CN | 101472310 A | 7/2009 |

OTHER PUBLICATIONS

Machine Translation and Abstract of Chinese Publication No. CN1984443, Jun. 20, 2007, 12 pages.
Machine Translation and Abstract of Chinese Publication No. CN101472310, Jul. 1, 2009, 12 pages.
Foreign Communication From A Counterpart Application, PCT Application No. PCT/CN2016/083754, English Translation of International Search Report dated Dec. 30, 2016, 2 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401, V13.6.1, Mar. 24, 2016, 365 pages.
Foreign Communication From A Counterpart Application, European Application No. 16902743.0, Extended European Search Report dated Mar. 6, 2019, 11 pages.

* cited by examiner

CALL PROCESSING METHOD, CALL SERVER, BASE STATION, AND CALL SYSTEM

CROSS-REFERENCE TO RELATED APPLICATIONS

This application is a continuation of International Patent Application No. PCT/CN2016/083754 filed on May 27, 2016, which is hereby incorporated by reference in its entirety.

TECHNICAL FIELD

The present disclosure relates to the field of communications technologies, and in particular, to a call processing method, a call server, a base station, and a call system.

BACKGROUND

An Internet Protocol (IP) multimedia subsystem (IMS) is a core network subsystem added in the 3rd Generation (3G) Partnership Project (3GPP) Release 5. The IMS is based on the Session Initiation Protocol (SIP), and is an open system integrating data, voice, and IP. The IMS can satisfy a requirement of today's end users for more novel and more diversified multimedia services, and is mainly used in a 3G network, a 4th generation (4G) network, and a next generation network (NGN). As a terminal supports increasingly rich functions, a power consumption problem becomes more serious. An existing Long Term Evolution (LTE) network provides a power saving mechanism for the terminal, and allows the terminal to enter a power saving mode in a standby state. In the power saving mode, the terminal turns off a radio frequency (RF) transceiver and another communications module, and does not monitor a physical downlink control channel (PDCCH). Therefore, the terminal does not receive data or signaling. This reduces power consumption of the terminal, and prolongs a battery lifespan of the terminal.

When receiving a call request of a calling terminal for a called terminal, a network element of a core network triggers a process of paging the called terminal. If the called terminal is in a power saving mode at this moment, the called terminal cannot receive a paging request, and a call session between the calling terminal and the called terminal cannot be established. As a result, the called terminal misses a call.

SUMMARY

Embodiments of the present disclosure provide a call processing method, a call server, a base station, and a call system in order to prevent a called terminal from missing a call.

According to a first aspect, a call processing method is provided, where the method includes receiving, by a call server, a first call request of a calling terminal for a called terminal, triggering, by the call server according to the first call request, a mobility management entity to control a base station to page the called terminal, performing, by the call server, call waiting according to the paging response message if receiving a paging response message that is sent by the mobility management entity and that is used to indicate that the called terminal is in a power saving state and cannot be paged by the base station, or determining, by the call server according to the paging response message, whether a preset condition is met, and performing call waiting if the preset condition is met, and establishing, by the call server, a session connection between the calling terminal and the called terminal according to the addressing information if receiving, in a call waiting process, addressing information of the called terminal sent by the mobility management entity, where the addressing information is used to indicate that the called terminal is woken up from the power saving state and is paged by the base station.

By implementing the method according to the first aspect, the call server performs call waiting when the call server receives the first call request of the calling terminal for the called terminal and learns that the called terminal is in the power saving state and therefore cannot be paged by the base station, or the call server performs call waiting when determining that the preset condition is met. If learning about the addressing information of the called terminal in the call waiting process, the call server can determine that the called terminal is paged by the base station, and therefore can establish the session connection between the calling terminal and the called terminal. This avoids a problem that the called terminal misses a call because the called terminal is in the power saving state.

With reference to the first aspect, in a first implementation of the first aspect, performing, by the call server, call waiting includes starting, by the call server, call waiting timing, and if receiving, in a call waiting process, addressing information of the called terminal sent by the mobility management entity, establishing, by the call server, a session connection between the calling terminal and the called terminal according to the addressing information includes if receiving, after call waiting timing is started and before preset call waiting duration elapses, the addressing information of the called terminal sent by the mobility management entity, establishing, by the call server, the session connection between the calling terminal and the called terminal according to the addressing information.

By performing the foregoing steps, the call server starts call waiting timing when learning that the called terminal is in the power saving state and therefore cannot be paged by the base station, and if receiving the addressing information of the called terminal after call waiting timing is started and before the preset call waiting duration elapses, the call server establishes the session connection between the calling terminal and the called terminal according to the addressing information, instead of keeping waiting for the called terminal to be paged by the base station. This reduces system power consumption of the call server.

With reference to the first aspect or the first implementation of the first aspect, in a second implementation of the first aspect, before establishing, by the call server, a session connection between the calling terminal and the called terminal according to the addressing information, the method further includes receiving, by the call server, the paging response message that is sent by the mobility management entity and that is used to indicate that the called terminal is in the power saving state and cannot be paged by the base station, and sending a call waiting instruction message to the calling terminal, where the call waiting instruction message is used to instruct the calling terminal to perform call waiting, and establishing, by the call server, a session connection between the calling terminal and the called terminal according to the addressing information includes sending, by the call server, the first call request to the called terminal according to the addressing information, where the first call request is used to instruct to establish the session connection between the calling terminal and the called terminal.

By performing the foregoing steps, when the call server learns that the called terminal is in the power saving state and therefore cannot be paged by the base station, the call server sends the call waiting instruction message to the calling terminal to trigger the calling terminal to perform the call waiting process, and sends the first call request to the called terminal after receiving the addressing information of the called terminal. This avoids a problem that the called terminal misses a call when the called terminal is in the power saving state.

With reference to the first aspect or the first implementation of the first aspect, in a third implementation of the first aspect, before establishing, by the call server, a session connection between the calling terminal and the called terminal according to the addressing information, the method further includes receiving, by the call server, the paging response message that is sent by the mobility management entity and that is used to indicate that the called terminal is in the power saving state and cannot be paged by the base station, terminating a current call, and recording information about the current call, and establishing, by the call server, a session connection between the calling terminal and the called terminal according to the addressing information includes sending, by the call server, a second call request to the calling terminal and the called terminal according to the addressing information, where the second call request is used to instruct to establish the session connection between the calling terminal and the called terminal.

By performing the foregoing steps, when the call server learns that the called terminal is in the power saving state and therefore cannot be paged by the base station, the call server terminates the current call to prevent the calling terminal from keeping waiting for the called terminal to be paged. In addition, the call server performs call waiting, and when receiving the addressing information of the called terminal in the call waiting process, sends the second call request to the calling terminal and the called terminal to establish the session connection between the calling terminal and the called terminal. This avoids a problem that the called terminal misses a call when the called terminal is in the power saving state.

With reference to any one of the first aspect or the implementations of the first aspect, in a fourth implementation of the first aspect, the method further includes receiving, by the call server, the paging response message that is sent by the mobility management entity and that is used to indicate that the called terminal is in the power saving state and cannot be paged by the base station, and sending, to the mobility management entity, a paging message used to instruct the base station to continuously page the called terminal.

By performing the foregoing steps, when learning that the called terminal is in the power saving state and cannot be paged by the base station, the call server triggers the mobility management entity to control the base station to continuously page the called terminal. In this way, the call server controls the base station to perform a continuous paging process.

According to a second aspect, a call processing method is provided, including receiving, by a base station, a paging message that is sent by a mobility management entity and that is used to instruct to page a called terminal, paging, by the base station, the called terminal according to the paging message, and if the called terminal is in a power saving state and cannot be paged by the base station, sending, by the base station to the mobility management entity, a paging response message used to indicate that the called terminal is in the power saving state and cannot be paged by the base station, and continuously paging, by the base station, the called terminal, and if it is determined, in a continuous paging process, that the called terminal is woken up from the power saving state, triggering the mobility management entity to send addressing information of the called terminal to a call server, where the addressing information is used to indicate that the called terminal is woken up from the power saving state and is paged by the base station.

By implementing the method according to the second aspect, when the base station determines, when paging the called terminal, that the called terminal is in the power saving state and therefore cannot be paged by the base station, the base station sends, to the mobility management entity, the paging response message used to indicate that the called terminal is in the power saving state and cannot be paged. In addition, the base station continuously pages the called terminal. When subsequently determining that the called terminal is paged, the base station triggers the mobility management entity to send the addressing information of the called terminal to the call server, to notify the call server to establish a session connection between a calling terminal and the called terminal. This prevents the called terminal from missing a call.

With reference to the second aspect, in a first implementation of the second aspect, continuously paging, by the base station, the called terminal includes receiving, by the base station, a continuous paging message that is sent by the mobility management entity and that is used to instruct to continuously page the called terminal, and continuously paging the called terminal according to the continuous paging message.

By performing the foregoing steps, the base station continuously pages the called terminal according to the continuous paging message sent by the mobility management entity.

According to a third aspect, a call server is provided, where the call server includes a processor, a memory, and a communications module, the memory is configured to store program code of call processing, and the processor is configured to invoke the program code of call processing to perform the following operations of receiving, by the processor using the communications module, a first call request of a calling terminal for a called terminal, triggering, by the processor according to the first call request, a mobility management entity to control a base station to page the called terminal, performing, by the processor, call waiting according to the paging response message if a paging response message that is sent by the mobility management entity and that is used to indicate that the called terminal is in a power saving state and cannot be paged by the base station is received, or determining, by the processor according to the paging response message, whether a preset condition is met, and performing call waiting if the preset condition is met, and establishing, by the processor, a session connection between the calling terminal and the called terminal according to the addressing information if addressing information of the called terminal sent by the mobility management entity is received in a call waiting process, where the addressing information is used to indicate that the called terminal is woken up from the power saving state and is paged by the base station.

By performing the foregoing operations, the call server performs call waiting when the call server receives the first call request of the calling terminal for the called terminal and learns that the called terminal is in the power saving state and therefore cannot be paged by the base station, or the call server performs call waiting when the preset condition is met. If learning about the addressing information of the called terminal in the call waiting process, the call server can determine that the called terminal is paged by the base station, and therefore can establish the session connection between the calling terminal and the called terminal. This avoids a problem that the called terminal misses a call because the called terminal is in the power saving state.

With reference to the third aspect, in a first implementation of the third aspect, performing, by the processor, call waiting includes starting, by the processor, call waiting timing, and if addressing information of the called terminal sent by the mobility management entity is received in a call waiting process, establishing, by the processor, a session connection between the calling terminal and the called terminal according to the addressing information includes establishing, by the processor, the session connection between the calling terminal and the called terminal according to the addressing information if the addressing information of the called terminal sent by the mobility management entity is received after call waiting timing is started and before preset call waiting duration elapses.

By performing the foregoing operations, the call server starts call waiting timing when learning that the called terminal is in the power saving state and therefore cannot be paged by the base station, and if receiving the addressing information of the called terminal after call waiting timing is started and before the preset call waiting duration elapses, the call server establishes the session connection between the calling terminal and the called terminal according to the addressing information, instead of keeping waiting for the called terminal to be paged by the base station. This reduces system power consumption of the call server.

With reference to the third aspect or the first implementation of the third aspect, in a second implementation of the third aspect, before establishing, by the processor, a session connection between the calling terminal and the called terminal according to the addressing information, the processor is further configured to receive the paging response message that is sent by the mobility management entity and that is used to indicate that the called terminal is in the power saving state and cannot be paged by the base station, and send a call waiting instruction message to the calling terminal using the communications module, where the call waiting instruction message is used to instruct the calling terminal to perform call waiting, and establishing, by the processor, a session connection between the calling terminal and the called terminal according to the addressing information includes sending, by the processor, the first call request to the called terminal according to the addressing information, where the first call request is used to instruct to establish the session connection between the calling terminal and the called terminal.

By performing the foregoing operations, when the call server learns that the called terminal is in the power saving state and therefore cannot be paged by the base station, the call server sends the call waiting instruction message to the calling terminal to trigger the calling terminal to perform the call waiting process, and sends the first call request to the called terminal after receiving the addressing information of the called terminal. This avoids a problem that the called terminal misses a call when the called terminal is in the power saving state.

With reference to the third aspect or the first implementation of the third aspect, in a third implementation of the third aspect, before establishing, by the processor, a session connection between the calling terminal and the called terminal according to the addressing information, the processor is further configured to receive the paging response message that is sent by the mobility management entity and that is used to indicate that the called terminal is in the power saving state and cannot be paged by the base station, terminate a current call, and record information about the current call, and establishing, by the processor, a session connection between the calling terminal and the called terminal according to the addressing information includes sending, by the processor, a second call request to the calling terminal and the called terminal according to the addressing information, where the second call request is used to instruct to establish the session connection between the calling terminal and the called terminal.

By performing the foregoing operations, when the call server learns that the called terminal is in the power saving state and therefore cannot be paged by the base station, the call server terminates the current call to prevent the calling terminal from keeping waiting for the called terminal to be paged. In addition, the call server performs call waiting, and when receiving the addressing information of the called terminal in the call waiting process, sends the second call request to the calling terminal and the called terminal to establish the session connection between the calling terminal and the called terminal. This avoids a problem that the called terminal misses a call when the called terminal is in the power saving state.

With reference to any one of the third aspect or the implementations of the third aspect, in a fourth implementation of the third aspect, the processor is further configured to receive the paging response message that is sent by the mobility management entity and that is used to indicate that the called terminal is in the power saving state and cannot be paged by the base station, and send, to the mobility management entity using the communications module, a paging message used to instruct the base station to continuously page the called terminal.

By performing the foregoing steps, when learning that the called terminal is in the power saving state and cannot be paged by the base station, the call server triggers the mobility management entity to control the base station to continuously page the called terminal. In this way, the call server controls the base station to perform a continuous paging process.

According to a fourth aspect, a base station is provided, where the base station includes a memory, a processor, and a transmitter and a receiver that are coupled to the processor, the memory is configured to store program code of call processing, and the processor is configured to invoke the program code of call processing to perform the following operations of receiving, by the processor using the communications module, a paging message that is sent by a mobility management entity and that is used to instruct to page a called terminal, paging, by the processor, the called terminal according to the paging message, and if the called terminal is in a power saving state and cannot be paged by the base station, sending, by the base station to the mobility management entity, a paging response message used to indicate that the called terminal is in the power saving state and cannot be paged by the base station, and continuously paging, by the processor, the called terminal, and if it is determined, in a continuous paging process, that the called terminal is woken up from the power saving state, triggering the mobility management entity to send addressing information of the called terminal to a call server, where the addressing information is used to indicate that the called terminal is woken up from the power saving state and is paged by the base station.

By performing the foregoing operations, when the base station determines, when paging the called terminal, that the called terminal is in the power saving state and therefore cannot be paged by the base station, the base station sends, to the mobility management entity, the paging response message used to indicate that the called terminal is in the power saving state and cannot be paged. In addition, the base station continuously pages the called terminal. When subsequently determining that the called terminal is paged, the base station triggers the mobility management entity to send the addressing information of the called terminal to the call server to notify the call server to establish a session connection between a calling terminal and the called terminal. This prevents the called terminal from missing a call.

With reference to the fourth aspect, in a first implementation of the fourth aspect, continuously paging, by the processor, the called terminal includes receiving, by the processor using the communications module, a continuous paging message that is sent by the mobility management entity and that is used to instruct to continuously page the called terminal, and continuously paging the called terminal according to the continuous paging message.

By performing the foregoing operations, the base station continuously pages the called terminal according to the continuous paging message sent by the mobility management entity.

According to a fifth aspect, a call server is provided, where the call server includes a module or unit configured to perform the call processing method according to any one of the first aspect or the implementations of the first aspect.

According to a sixth aspect, a base station is provided, where the base station includes a module or unit configured to perform the call processing method according to any one of the second aspect or the implementations of the second aspect.

According to a seventh aspect, a call system is provided, where the call system includes the call server according to the third aspect or the fifth aspect and the base station according to the fourth aspect or the sixth aspect.

With reference to the seventh aspect, in a first implementation of the seventh aspect, the called terminal is configured to determine whether a current moment is in a preset call time period or a preset data access time period, and set power saving duration of a power saving state to first preset duration if the current moment is in the preset call time period, or set power saving duration of a power saving state to second preset duration if the current moment is in the preset data access time period, where the first preset duration is shorter than the second preset duration.

Different power saving duration is set according to different usage scenarios. Therefore, power saving duration of the called terminal can be adjusted more flexibly such that better power saving is implemented without missing a call.

According to an eighth aspect, a computer readable storage medium is provided, where the readable storage medium stores program code for implementing the call processing method according to any one of the first aspect or the implementations of the first aspect, and the program code includes an execution instruction for running the foregoing call processing method.

According to a ninth aspect, a computer readable storage medium is provided, where the readable storage medium stores program code for implementing the call processing method according to any one of the second aspect or the implementations of the second aspect, and the program code includes an execution instruction for running the foregoing call processing method.

With reference to any one of the foregoing aspects, in some implementations of the present disclosure, the paging response message carries duration required for waking up the called terminal from the power saving state, and the preset call waiting duration is longer than or equal to the duration required for waking up the called terminal from the power saving state.

The call server learns about, using the paging response message, the duration required for waking up the called terminal from the power saving state, and further sets the preset call waiting duration according to the duration required for waking up the called terminal from the power saving state. This ensures that the called terminal can be paged after call waiting timing is started and before the preset call waiting duration elapses, and therefore prevents the called terminal from missing a call.

With reference to any one of the foregoing aspects, in some implementations of the present disclosure, the preset condition includes at least one of a quantity of calls originated by the calling terminal to the called terminal in a preset time period reaches a preset call quantity threshold, a message sent by the calling terminal and used to instruct to perform call waiting is received, the called terminal subscribes to a call waiting service in advance, or the calling terminal subscribes to a call waiting service in advance.

The call server performs call waiting only when determining that the preset condition is met, instead of performing call waiting whenever the called terminal cannot be paged. This reduces load pressure on the call server, and reduces power consumption of the call server.

BRIEF DESCRIPTION OF DRAWINGS

To describe the technical solutions in some of the embodiments of the present disclosure more clearly, the following briefly describes the accompanying drawings describing some of the embodiments.

DESCRIPTION OF EMBODIMENTS

Terms used in an implementation part of the present disclosure are merely intended to explain specific embodiments of the present disclosure, but are not intended to limit the present disclosure. The following clearly describes the technical solutions in the embodiments of the present disclosure with reference to the accompanying drawings in the embodiments of the present disclosure.

Figure 1:
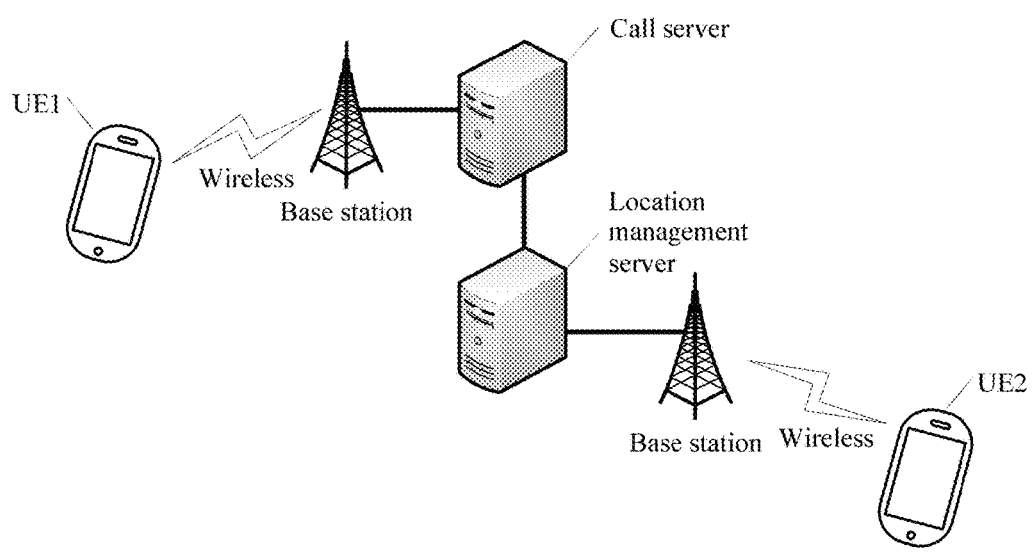
FIG. 1 is a schematic diagram of a network architecture of a call system according to an embodiment of the present disclosure.

Referring to FIG. 1, FIG. 1 is a schematic diagram of a network architecture of a call system according to an embodiment of the present disclosure. As shown in FIG. 1, the call system architecture mainly includes a calling terminal UE1, a called terminal UE2, a call server, a mobility management entity, and a base station.

The base station and the UE1 and/or UE2 communicate with each other using an air interface technology. The air interface technology may include existing second generation (2G) (for example, Global System for Mobile Communications (GSM)), 3G (for example, Universal Mobile Telecommunications System (UMTS), Wideband Code Division Multiple Access (WCDMA), and Time Division-Synchronous Code Division Multiple Access (TD-SCDMA)), 4G (for example, frequency division duplex (FDD) LTE and time division duplex TDD LTE), NGN (for example, 4.5G or 5G) system to be launched in the future, and the like.

The base station may be an evolved NodeB (eNB) in an LTE communications system, a NodeB in a UMTS communications system, or a base transceiver station (BTS) in a GSM communications system. The UE1 and the UE2 are user equipments (UE) in a 3G or 4G network, are equivalent to mobile stations (MS) in a 2G network, and may include a mobile phone, a tablet computer, a mobile Internet device (MID), a smart wearable device (for example, a smartwatch or a smart band), or another terminal device or communications module on which a universal subscriber identity module (USIM) or subscriber identity module (SIM) card is installed.

The mobility management entity may be a mobility management entity (MME) in LTE, or may be an Serving General Packet Radio Services (GPRS) Support Node (SGSN) in 2G.

If a UE user is an IMS user, the call server is a call session control function (CSCF) entity in an IMS system. If a UE user is a circuit switched (CS) user, the call server is a mobile switching center (MSC), and can support subscription to a "call waiting service" described in the following embodiment.

The "call waiting service" means when the UE1 calls the UE2, if the UE2 is in a power saving state and therefore cannot be paged by the base station currently, the UE1 needs to keep current call waiting before the UE2 is paged by the base station. When the UE2 is paged by the base station, the call server sends, to the UE2, a call request of the UE1 in order to establish a session connection between the UE1 and the UE2. Alternatively, the "call waiting service" means when the UE1 calls the UE2, if the UE2 is in a power saving state and therefore cannot be paged by the base station currently, the call server terminates a current call process, and waits for the UE2 to be paged by the base station. When the UE2 is paged by the base station, the call server re-initiates sending a call request to the UE1 and the UE2 in order to establish a session connection between the UE1 and the UE2. A CSCF is a core part of an IMS, is mainly used for packet-switched-based SIP session control, and is used to connect a call between the UE1 and the UE2. In the IMS, the CSCF is responsible for processing a user multimedia session. In terms of different main functions, the CSCF may be divided into a proxy CSCF (P-CSCF), an interrogating CSCF (I-CSCF), and a serving CSCF (S-CSCF). The three functions may be physically separated, or may be independent.

The S-CSCF plays a core control role in an IMS core network, and is responsible for terminal registration authentication and session control. The S-CSCF performs a basic session routing function for a terminal, and performs, when a condition is met, value-added service routing triggering and service control interaction on an application server (AS) according to a user-subscribed IMS triggering rule.

The I-CSCF is a gateway node of the IMS, and provides local-domain user service node allocation, route lookup, and IMS inter-domain topology hiding functions.

The P-CSCF is a connection point with a user in the IMS, and provides a proxy function, that is, accepting and forwarding a service request (e.g., INVITE). The P-CSCF may also provide a user agent (UA) function, that is, interrupting and independently generating a SIP session in an abnormal case.

Figure 2:
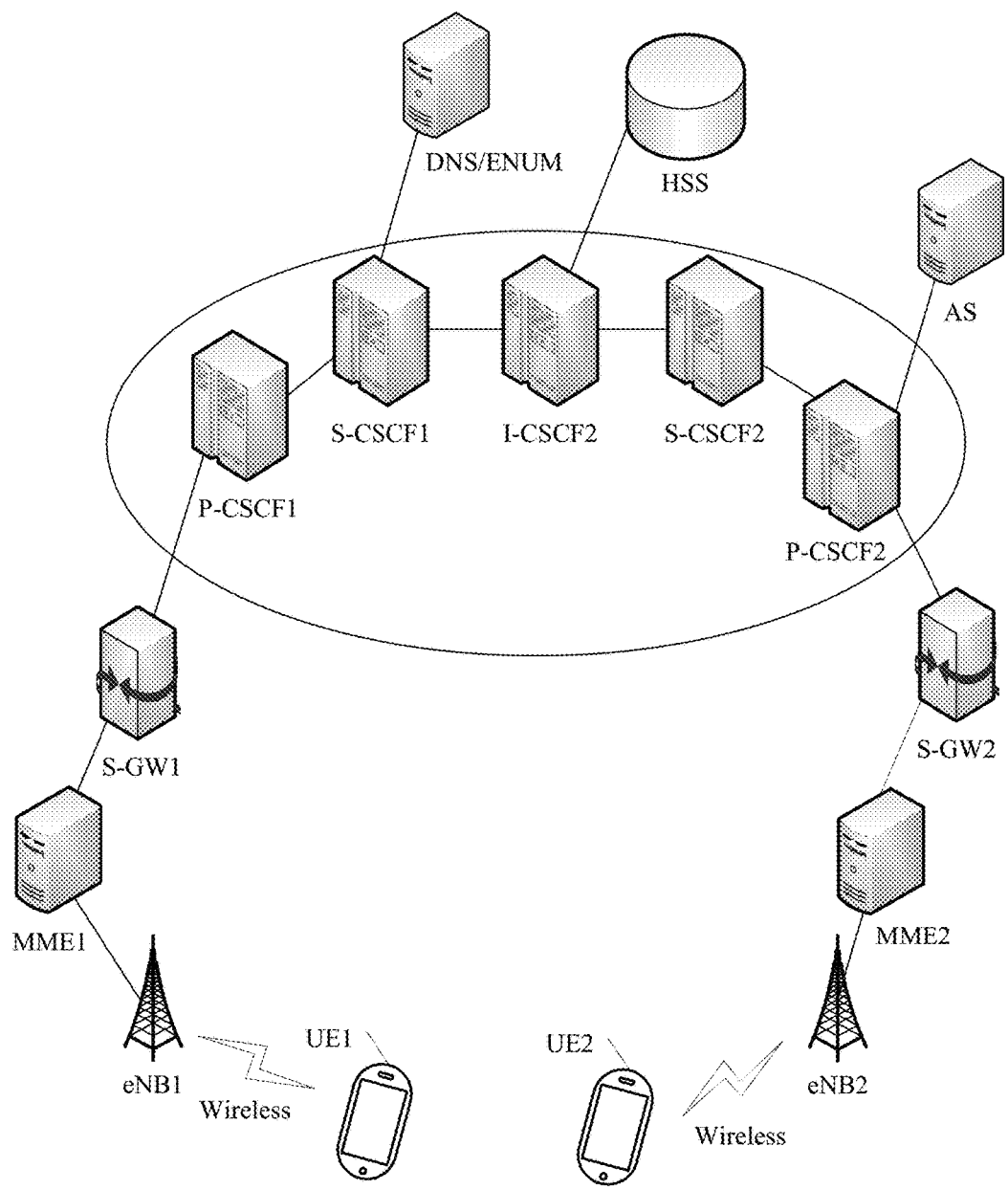
FIG. 2 is a schematic architecture diagram of a call system in an LTE network according to an embodiment of the present disclosure.

Further, referring to FIG. 2, FIG. 2 is a schematic architecture diagram of a call system in an LTE network according to an embodiment of the present disclosure. As shown in FIG. 2, the call system in the LTE network mainly includes a calling terminal UE1, a called terminal UE2, an eNB1 corresponding to the UE1, an MME1 corresponding to the UE1, a call server 1 (including a P-CSCF1 and an S-CSCF1) corresponding to the UE1, a call server 2 (including an I-CSCF2, an S-CSCF2, and a P-CSCF2) corresponding to the UE2, an MME2 corresponding to the UE2, and an eNB2 corresponding to the UE2.

In addition, the call system may further include a serving gateway (S-GW) S-GW1 corresponding to the UE1, a domain name system (DNS)/an E.164 number to Uniform Resource Identifier (URI) mapping (ENUM) system, a home subscriber server (HSS), an AS, and an S-GW2 corresponding to the UE2.

The UE1 and the UE2 are registered with the call server in advance. Registration information includes a phone number and an IP address of each terminal, configuration information indicating whether the "call waiting service" described in the following embodiment is allowed to be enabled, and the like.

The DNS/ENUM is configured to perform mapping resolution on a phone number of the UE2 sent by the S-CSCF1 to obtain an IP address of the I-CSCF2 corresponding to the UE2.

The HSS is configured to receive a query request of the I-CSCF2, search for an S-CSCF to which the UE2 belongs, and feedback a search result to the I-CSCF2.

The S-GW2 is configured to obtain, from the MME2, address information of the UE2 according to data information of the UE2 received from the P-CSCF2, for example, a SIP invite message.

The MME2 is configured to instruct, according to an instruction of the S-GW2 and a tracking area (TA) of the UE2, an eNB within a TA range to page the UE2.

The eNB2 is configured to initiate, according to an instruction of the MME2, paging to the UE2, and if the UE2 has entered a power saving state, inform the MME2 of a paging failure and a failure cause "The called terminal is in the power saving state and cannot be paged by the base station." The eNB2 can receive power saving duration or a power saving period of the UE2, and calculate, according to the power saving duration or power saving period of the UE2, a proper timeslot for paging the UE2.

The UE2 supports a power saving mode, can set power saving duration of the power saving mode to be longer than power saving duration in a conventional technology, and can send the power saving duration of the UE2 to the eNB2. Optionally, the UE2 supports more intelligent power saving period selection, that is, the power saving period is long during data access, and the power saving period is short when a call service dominates. Optionally, the UE2 may alternatively be a dual SIM dual standby mobile phone. Correspondingly, the UE1 may also support a power saving mode, and may send power saving duration of the UE1 to the eNB1.

If the call server 2 is informed that the UE2 is in the power saving state and therefore cannot be paged currently, the call server 2 may perform call waiting for a current call according to a requirement, and perform the current call again after the UE2 is paged. Optionally, the call server 2 may alternatively terminate a current call request, record information about a current call, and re-connect the current call after the UE2 is paged. In addition, the call server 2 can select one method from the two methods.

Optionally, the AS may record, in place of the call server 2, the information about the current call, and trigger, after being informed by the MME2 that the UE2 is paged, the call server 2 to re-connect the current call.

Figure 3A:
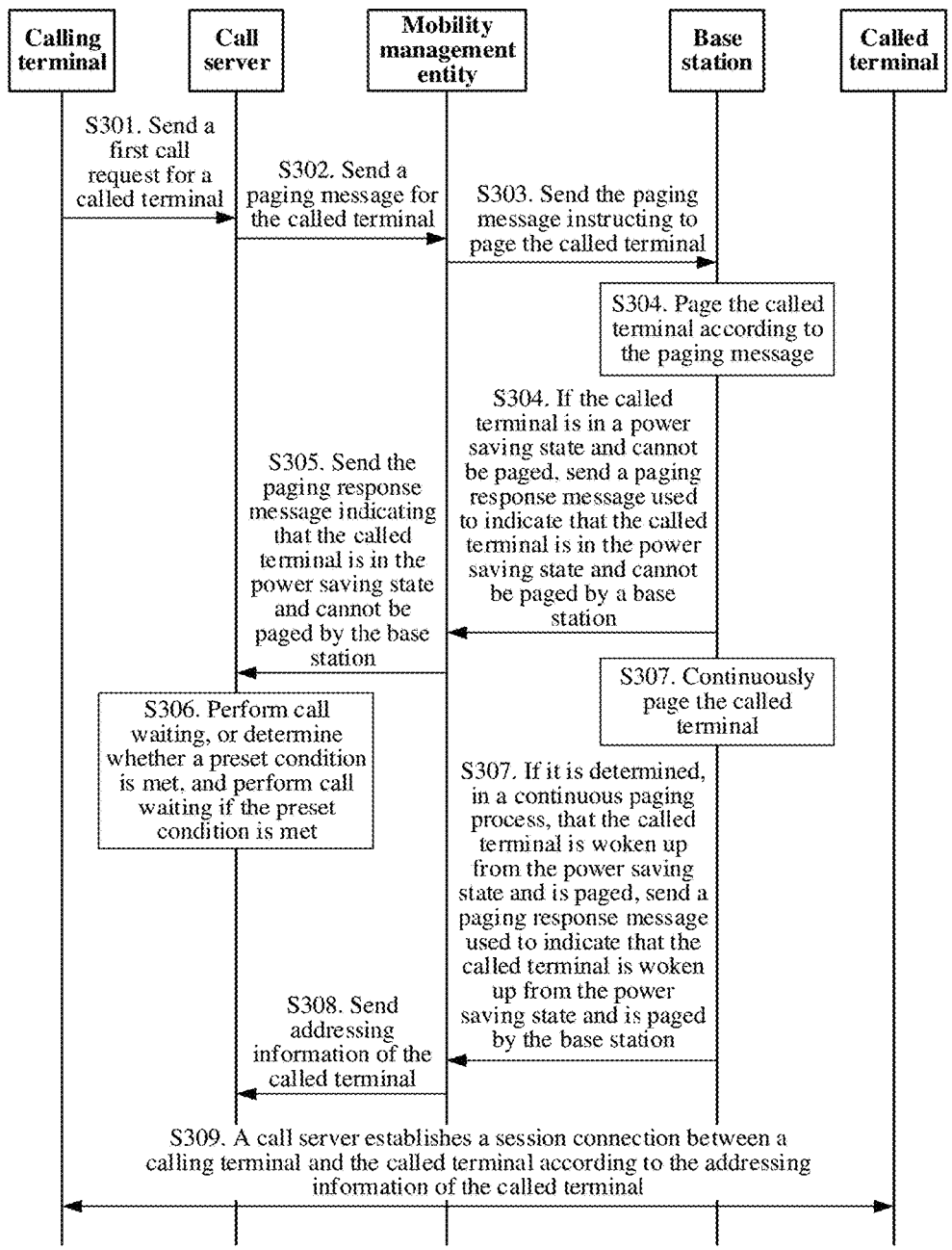
FIG. 3A is a schematic flowchart of a call processing method according to an embodiment of the present disclosure.

Referring to FIG. 3A, FIG. 3A is a schematic flowchart of a call processing method according to an embodiment of the present disclosure. The method includes but is not limited to the following steps.

Step S301: A call server receives a first call request for a called terminal sent by a calling terminal.

Further, the calling terminal sends the first call request to the call server corresponding to the calling terminal. The first call request carries an identity of the calling terminal and an identity of the called terminal. The identity includes but is not limited to a phone number. After receiving the first call request, the call server corresponding to the calling terminal parses out the identity of the called terminal from the first call request, and determines a call server corresponding to the called terminal. If the call server corresponding to the called terminal is the call server itself (that is, the call server corresponding to the calling terminal), the call server performs step S302. If the call server corresponding to the called terminal is another call server, the call server corresponding to the calling terminal forwards the first call request to the call server corresponding to the called terminal. The call server corresponding to the called terminal receives the first call request, and performs step S302.

For example, if both the call server corresponding to the calling terminal and the call server corresponding to the called terminal are CSCFs, a CSCF (for example, a P-CSCF or an S-CSCF) corresponding to the calling terminal receives the first call request, then parses out a phone number of the called terminal, and performs domain name resolution according to the phone number of the called terminal to obtain an IP address of an I-CSCF corresponding to the called terminal. Then, the CSCF corresponding to the calling terminal forwards the first call request to the I-CSCF corresponding to the called terminal. Then, the first call request is sent to an S-CSCF or a P-CSCF corresponding to the called terminal. After receiving the first call request, the S-CSCF or the P-CSCF corresponding to the called terminal performs step S302.

Step S302: The call server sends, to a mobility management entity, a paging message for paging the called terminal.

Further, after parsing out the identity of the called terminal according to the first call request, the call server corresponding to the called terminal sends, to the mobility management entity corresponding to the called terminal, the paging message for paging the called terminal such that the mobility management entity triggers a base station to page the called terminal.

For example, if the call server corresponding to the called terminal is a CSCF and the base station corresponding to the called terminal is an eNB, the P-CSCF corresponding to the called terminal sends the paging message to the MME. The paging message carries an international mobile subscriber identity (IMSI) or a temporary mobile subscriber identity (TMSI) of the called terminal. The MME maintains a TA list for each terminal. The TA list includes a plurality of TAs, that is, all cells with which the called terminal registers within a specific time period. The MME delivers the paging message to all eNBs in the TA list using an Si interface to trigger the eNB to page the called terminal.

Step S303: The mobility management entity sends, to the base station, the paging message used to instruct to page the called terminal.

The paging message carries an IMSI or a TMSI of the called terminal.

Step S304: The base station pages the called terminal according to the paging message, and if the called terminal is in a power saving state and cannot be paged by the base station, the base station sends, to the mobility management entity, a paging response message used to indicate that the called terminal is in the power saving state and cannot be paged by the base station.

Further, in an attach process, the called terminal sends a power saving period (including start time of a working state, duration of the working state, start time of a sleep state, and duration of the sleep state) of the called terminal to the base station, and the base station records the power saving period of the called terminal. For an LTE network, the working state may be an active state of discontinuous reception (DRX), and the sleep state may be a dormant state of DRX. The base station and the called terminal are time-synchronized. Therefore, when receiving the paging message for paging the called terminal that is sent by the mobility management entity, the base station may learn, according to information recorded in advance, that the called terminal is currently in the power saving state (that is, the sleep state), and may obtain, through calculation, duration required for waking up the called terminal from the power saving state (that is, for the called terminal to switch from the sleep state to the working state).

Alternatively, each time when the called terminal switches from the working state to the sleep state, the called terminal sends power saving duration (that is, duration of the sleep state) of the called terminal to the base station. The base station records start time at which the called terminal enters the sleep state and the duration of the sleep state. Therefore, when receiving the paging message for paging the called terminal that is sent by the mobility management entity, the base station may obtain, through calculation according to information recorded in advance, that the called terminal is currently in the power saving state (that is, the sleep state). In addition, the base station calculates, according to the power saving duration of the called terminal, a proper timeslot for paging the called terminal to inform the called terminal that there is an incoming-call request. Optionally, the base station corresponding to the called terminal may further obtain, through calculation, duration required for waking up the called terminal from the power saving state (that is, for the called terminal to switch from the sleep state to the working state).

For example, if the call server corresponding to the called terminal is a CSCF and the base station corresponding to the called terminal is an eNB, the eNB in a TA area sends, to the MME after receiving the paging message for the called terminal that is sent by the MME, the paging response message used to indicate that the called terminal is currently in the power saving state and therefore cannot be paged by the base station. Then, the MME sends, to the CSCF corresponding to the called terminal, the paging response message used to indicate that the called terminal is currently in the power saving state and therefore cannot be paged by the base station.

Optionally, the foregoing paging response message may further carry duration required for waking up the called terminal from the power saving state.

Step S305: The mobility management entity sends, to the call server, the paging response message used to indicate that the called terminal is in the power saving state and cannot be paged by the base station.

Step S306: After receiving the paging response message, the call server performs call waiting, or determines whether a preset condition is met, and performs call waiting if the preset condition is met.

Further, if the call server receives the paging response message used to indicate that the called terminal is in the power saving state and cannot be paged by the base station, the call server performs call waiting, and waits for the called terminal to be woken up from the power saving state. Alternatively, when the preset condition is met, the call server performs call waiting, and waits for the called terminal to be woken up from the power saving state.

Optionally, after receiving the paging response message used to indicate that the called terminal is in the power saving state and cannot be paged by the base station, the call server sends, to the calling terminal, a call waiting instruction message used to instruct to perform call waiting such that the calling terminal performs call waiting, thereby preventing the called terminal from missing a call. Optionally, the call waiting message may further carry call waiting duration. The call waiting duration is duration that is obtained through calculation by the base station corresponding to the called terminal and that is required for waking up the called terminal from the power saving state.

For example, if the call server corresponding to the called terminal is a CSCF, the CSCF corresponding to the called terminal sends a 180 ringing message to the calling terminal to inform the calling terminal that an invite message has been delivered to a called side and inform the calling terminal that the called terminal has ringed (but actually the called terminal does not ring). Optionally, the 180 ringing message carries a call waiting field, that is, a call waiting parameter to indicate that the 180 ringing message is a call waiting message. For example, the calling terminal plays an announcement, "The subscriber you dialed has enabled a power saving function, and you may need to wait 20 seconds (s) before the call is connected," or the like.

Figure 3B:
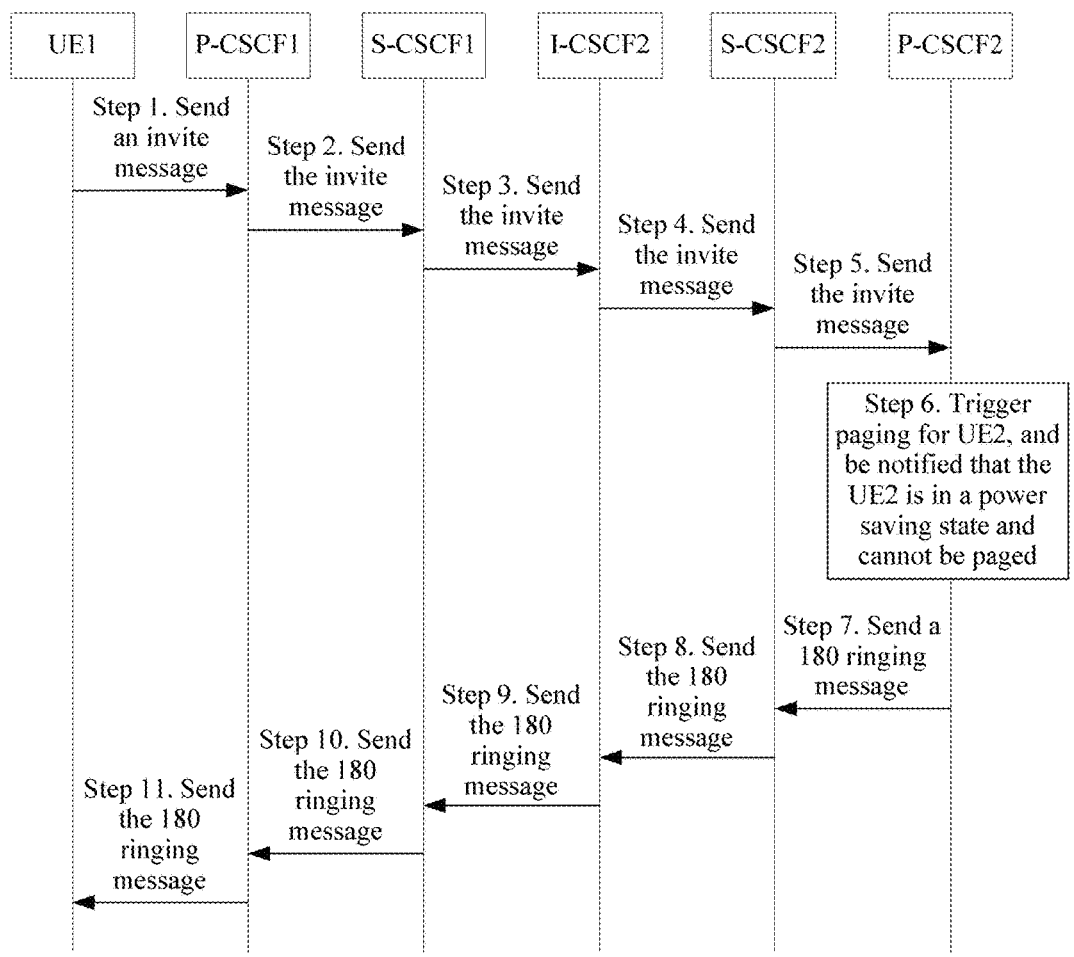
FIG. 3B is a schematic flowchart of performing call waiting processing by a call server in an LTE network according to an embodiment of the present disclosure.

Further, referring to FIG. 3B, FIG. 3B is a schematic flowchart of performing call waiting processing by a call server in an LTE network. The process includes steps 1 to 11. Detailed descriptions of each step are as follows.

Step 1: A calling terminal UE1 sends an invite message to a P-CSCF1 corresponding to the UE1, where the invite message carries an identity of a called terminal UE2.

Step 2: The P-CSCF1 forwards the invite message to an S-CSCF1 corresponding to the UE1.

Step 3: The S-CSCF1 obtains, using a DNS/an ENUM, an IP address corresponding to the UE2, and forwards, according to the IP address, the invite message to an I-CSCF2 corresponding to the UE2.

Step 4: The I-CSCF2 forwards the invite message to an S-CSCF2 corresponding to the UE2.

Step 5: The S-CSCF2 forwards the invite message to a P-CSCF2 corresponding to the UE2.

Step 6: The P-CSCF2 triggers an eNB2 to page the UE2, and learns, from the eNB2, that the UE2 is in a power saving state and cannot be paged by the base station.

Step 7: The P-CSCF2 sends a 180 ringing message to the S-CSCF2, where the 180 ringing message carries a call waiting parameter.

Step 8: The S-CSCF2 forwards the 180 ringing message to the I-CSCF2.

Step 9: The I-CSCF2 forwards the 180 ringing message to the S-CSCF1.

Step 10: The S-CSCF1 forwards the 180 ringing message to the P-CSCF1.

Step 11: The P-CSCF1 forwards the 180 ringing message to the UE1.

Optionally, after receiving the paging response message used to indicate that the called terminal is in the power saving state and cannot be paged by the base station, the call server terminates a current call, sends, to the calling terminal, an instruction message used to instruct to terminate the current call request, and records information about the current call. Optionally, the instruction message may further carry a call failure cause, for example, "The subscriber you dialed has enabled a power saving function, and the call cannot be connected for the moment."

For example, if the call server corresponding to the called terminal is a CSCF, the CSCF corresponding to the called terminal sends a cancel or bye message to a CSCF corresponding to the calling terminal to terminate the current call request. The CSCF corresponding to the calling terminal receives the cancel or bye message, and forwards the cancel or bye message to the calling terminal. The calling terminal plays a ringback tone to notify a calling-terminal user that the called terminal cannot be connected.

The call information may include the identity of the calling terminal and the identity of the called terminal such that when the called terminal is subsequently paged by the base station, the call server can send a second call request to the calling terminal and the called terminal to establish a session connection between the calling terminal and the called terminal.

Optionally, the call server corresponding to the called terminal may alternatively instruct an AS to record information about a current call. When a call connection process is subsequently performed, the call server corresponding to the called terminal obtains, from the AS, the information about the current call, and then sends the second call request to the calling terminal and the called terminal.

Figure 3C:
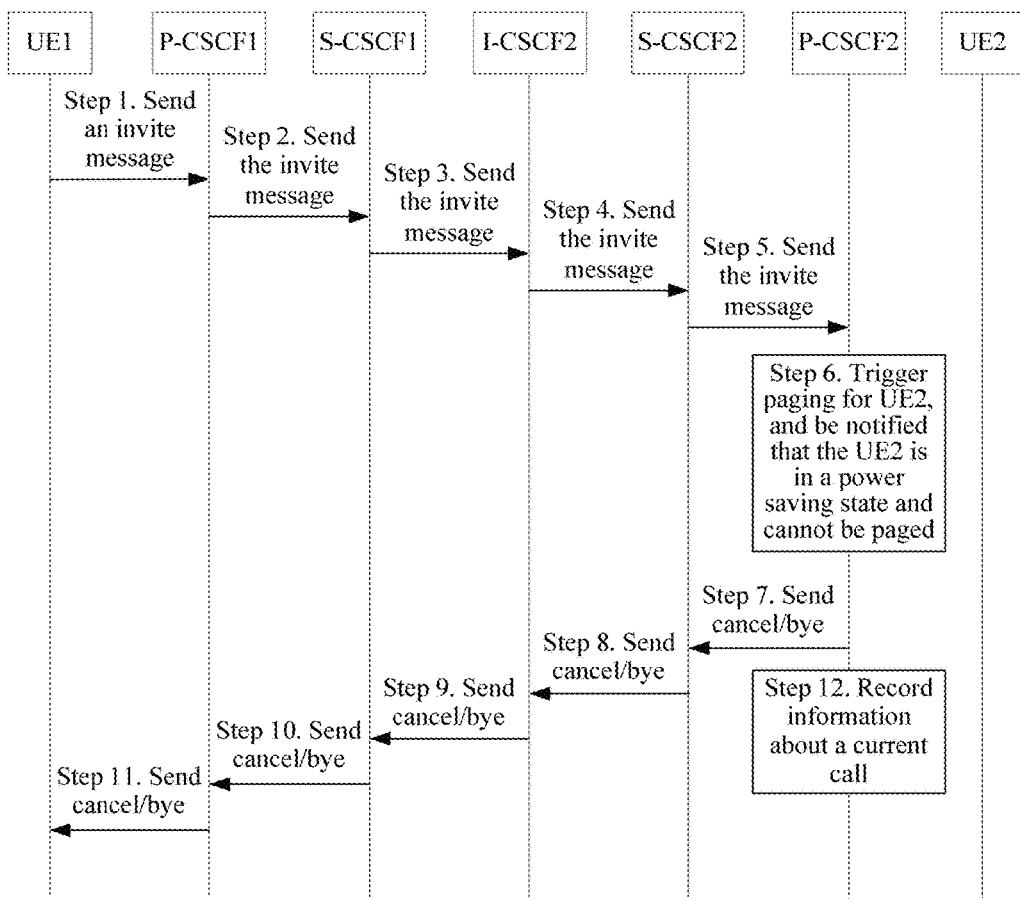
FIG. 3C is another schematic flowchart of performing call waiting processing by a call server in an LTE network according to an embodiment of the present disclosure.

Further, referring to FIG. 3C, FIG. 3C is another schematic flowchart of performing call waiting processing by a call server in an LTE network according to an embodiment of the present disclosure. The process includes steps 1 to 12. Detailed descriptions of each step are as follows.

Step 1: A calling terminal UE1 sends an invite message to a P-CSCF1 corresponding to the UE1, where the invite message carries an identity of a called terminal UE2.

Step 2: The P-CSCF1 forwards the invite message to an S-CSCF1 corresponding to the UE1.

Step 3: The S-CSCF1 obtains, using a DNS/an ENUM, an IP address corresponding to the UE2, and forwards, according to the IP address, the invite message to an I-CSCF2 corresponding to the UE2.

Step 4: The I-CSCF2 forwards the invite message to an S-CSCF2 corresponding to the UE2.

Step 5: The S-CSCF2 forwards the invite message to a P-CSCF2 corresponding to the UE2.

Step 6: The P-CSCF2 triggers an eNB2 to page the UE2, and is informed that the UE2 is in a power saving state and cannot be paged by the base station.

Step 7: The P-CSCF2 sends a cancel/bye message to the S-CSCF2.

Step 8: The S-CSCF2 forwards the cancel/bye message to the I-CSCF2.

Step 9: The I-CSCF2 forwards the cancel/bye message to the S-CSCF1.

Step 10: The S-CSCF1 forwards the cancel/bye message to the P-CSCF1.

Step 11: The P-CSCF1 forwards the cancel/bye message to the UE1.

Step 12: The P-CSCF2 records information about a current call, where the call information includes an identity of the UE1 and the identity of the UE2.

A performing sequence of step 7 and step 12 is not limited. For example, step 7 may be performed before step 12, may be performed after step 12, or may be performed simultaneously with step 12.

Optionally, the preset condition includes at least one of a quantity of calls originated by the calling terminal to the called terminal in a preset time period reaches a preset call quantity threshold, a message sent by the calling terminal and used to instruct to perform call waiting is received, the called terminal subscribes to a call waiting service in advance, or the calling terminal subscribes to a call waiting service in advance.

If the call server successively receives, within a period of time, a plurality of call requests of the calling terminal for the called terminal, and a quantity of the call requests exceeds the preset call quantity threshold, the call server determines that the call is an emergency call. In this case, the call server automatically triggers a call waiting process, and waits to receive addressing information of the called terminal sent by the mobility management entity in order to establish the session connection between the calling terminal and the called terminal in a timely manner when the called terminal is subsequently woken up from the power saving state. This prevents the called terminal from missing a call. The preset call quantity threshold may be set by the server by default. For example, the preset call quantity threshold is 3.

If the call server receives the paging response message sent by the mobility management entity, informs, using an announcement or an SMS message, the calling terminal that the called terminal has entered the power saving state, and asks the calling terminal whether to perform the call waiting process, and the calling terminal determines to start the "call waiting process," the calling terminal sends, to the call server, a message indicating that the calling terminal determines to start the "call waiting process." After receiving the message, the call server waits to receive the addressing information of the called terminal sent by the mobility management entity in order to establish the session connection between the calling terminal and the called terminal in a timely manner when the called terminal is subsequently woken up from the power saving state. This prevents the called terminal from missing a call.

If the calling terminal determines that a user dials a number of the called terminal a plurality of times, or the calling terminal dials a plurality of different numbers of a called-terminal user, or the calling terminal sends an SMS message to a number of the called terminal and the SMS message includes "emergency," "quickly," or another word indicating that the current call is relatively important, the calling terminal determines that the current call is an important call. In this case, the calling terminal sends, to the call server, a request for starting the "call waiting process." After receiving the request, the call server waits to receive the addressing information of the called terminal sent by the mobility management entity in order to establish the session connection between the calling terminal and the called terminal in a timely manner when the called terminal is subsequently woken up from the power saving state. This prevents the called terminal from missing a call.

The call server queries subscription information of the called terminal. If the called terminal subscribes to the "call waiting service," the call server waits to receive the addressing information of the called terminal sent by the mobility management entity in order to establish the session connection between the calling terminal and the called terminal in a timely manner when the called terminal is subsequently woken up from the power saving state. This prevents the called terminal from missing a call.

The call server queries subscription information of the calling terminal. If the calling terminal subscribes to the "call waiting service," the call server waits to receive the addressing information of the called terminal sent by the mobility management entity in order to establish the session connection between the calling terminal and the called terminal in a timely manner when the called terminal is subsequently woken up from the power saving state. This prevents the called terminal from missing a call.

It should be noted that the preset condition may include only one of the plurality of conditions, or may include two, three, or four of the plurality of conditions. This is not further limited in this embodiment of the present disclosure. For example, the preset condition includes the following. The quantity of calls originated by the calling terminal to the called terminal in the preset time period reaches the preset call quantity threshold, and the called terminal subscribes to the "call waiting service" in advance.

Step S307: The base station continuously pages the called terminal, and if it is determined, in a continuous paging process, that the called terminal is woken up from the power saving state and is paged, the base station sends, to the mobility management entity, a paging response message used to indicate that the called terminal is woken up from the power saving state and is paged by the base station.

Further, when the called terminal is in the power saving state and cannot be paged, the base station automatically triggers continuous paging for the called terminal. In addition, when the called terminal is woken up from the power saving state, the base station sends a paging message to the called terminal, where the paging message carries an IMSI or a TMSI corresponding to the called terminal. After receiving the paging message, the called terminal sends a paging response to the base station, where the paging response carries the IMSI or the TMSI corresponding to the called terminal. The base station receiving the paging response sends the paging response to the mobility management entity. The mobility management entity determines, according to the paging response, a base station serving the called terminal, and then obtains the addressing information (location information) of the called terminal.

For example, if the call server corresponding to the called terminal is a CSCF and the base station corresponding to the called terminal is an eNB, the eNB in a TA sends a paging request to the called terminal when determining that the called terminal is woken up from the power saving state, where the paging request carries an IMSI or a TMSI of the called terminal. After receiving the paging request, the called terminal sends a paging response to the eNB to which the called terminal currently attaches. The eNB receiving the paging response sends the paging response to the MME, where the paging response carries the IMSI or the TMSI of the called terminal. After receiving the paging response returned by the eNB, the MME determines the addressing information of the called terminal, and sends the addressing information to the CSCF (for example, a P-CSCF or an S-CSCF) corresponding to the called terminal.

Optionally, if receiving the paging response message that is sent by the mobility management entity and that is used to indicate that the called terminal is in the power saving state and cannot be paged by the base station, the call server sends, to the mobility management entity, a continuous paging message used to instruct to continuously page the called terminal. After receiving the continuous paging message, the mobility management entity sends, to the base station, the continuous paging message used to instruct to continuously page the called terminal. When receiving the continuous paging message, the base station continuously pages the called terminal.

Step S308: The mobility management entity receives the paging response message that is sent by the base station and that is used to indicate that the called terminal is woken up from the power saving state and is paged by the base station, and sends the addressing information of the called terminal to the call server.

S309: The call server establishes a session connection between the calling terminal and the called terminal according to the addressing information of the called terminal.

Further, when receiving the addressing information of the called terminal sent by the mobility management entity, the call server establishes the session connection between the calling terminal and the called terminal according to the addressing information of the called terminal to implement a call between a calling-terminal user and a called-terminal user.

Optionally, the call server corresponding to the called terminal starts a "call waiting" timer when receiving the paging response message used to indicate that the called terminal is in the power saving state and cannot be paged by the base station. If the call server corresponding to the called terminal receives, after the timer starts timing and before preset call waiting duration elapses, the addressing information of the called terminal sent by the mobility management entity, the call server corresponding to the called terminal establishes the session connection between the calling terminal and the called terminal. The preset call waiting duration may be set, by default, by the call server corresponding to the called terminal. For example, the preset call waiting duration is 30 s.

Optionally, when the call server determines that the called terminal is in the power saving state and cannot be paged by the base station, if the call server sends a call waiting instruction message to the calling terminal instead of terminating the current call, when receiving the addressing information of the called terminal sent by the mobility management entity, the call server sends, to the called terminal, the first call request of the calling terminal for the called terminal in order to establish the session connection between the calling terminal and the called terminal.

For example, if the call server corresponding to the called terminal is a CSCF and the base station corresponding to the called terminal is an eNB, when receiving the addressing information of the called terminal sent by the MME, the CSCF corresponding to the called terminal sends, to the MME, the first call request of the calling terminal for the called terminal. Then, the MME forwards the first call request to the eNB to which the called terminal currently attaches. Then, the eNB sends the first call request to the called terminal. After the called-terminal user taps an "answer" button, the session connection between the calling terminal and the called terminal is successfully established, and the calling-terminal user and the called-terminal user may talk.

Optionally, the call server corresponding to the called terminal starts a "call waiting" timer when receiving the paging response message used to indicate that the called terminal is in the power saving state and cannot be paged by the base station. If the call server corresponding to the called terminal receives, after the timer starts timing and before preset call waiting duration elapses, the addressing information of the called terminal sent by the mobility management entity, the call server corresponding to the called terminal sends the first call request to the called terminal. If the paging response message is still not received after the preset call waiting duration of the timer elapses, the call server corresponding to the called terminal does not perform a step of sending the call request to the called terminal any longer, that is, the call server corresponding to the called terminal does not keep waiting for the called terminal to be paged. This reduces system power consumption of the call server. The preset call waiting duration may be set, by default, by the call server corresponding to the called terminal. For example, the preset call waiting duration is 30 s.

For example, if the paging response message is still not received after the preset call waiting duration of the timer elapses, the call server corresponding to the called terminal cancels the current call request, and sends a call failure indication message to the calling terminal. Optionally, the indication message may further carry a call failure cause, for example, "The subscriber you dialed has enabled a power saving function, and the call cannot be connected for the moment." A SIP phone is used as an example. The CSCF corresponding to the called terminal sends a cancel or bye message to the CSCF corresponding to the calling terminal, to terminate the current call request. The CSCF corresponding to the calling terminal receives the cancel or bye message, and sends the cancel or bye message to the calling terminal, to notify the calling-terminal user that the called terminal cannot be connected.

Optionally, when the call server determines that the called terminal is in the power saving state and cannot be paged by the base station, if the call server terminates the current call and records information about the current call, when receiving the addressing information of the called terminal sent by the mobility management entity, the call server sends a second call request to the calling terminal and the called terminal according to the previously recorded call information in order to establish the session connection between the calling terminal and the called terminal. Optionally, for a call request sent by the call server to the calling terminal, the called terminal is a calling party, for a call request sent by the call server to the called terminal, the calling terminal is a calling party.

Optionally, the call server starts a "call waiting" timer when receiving the paging response message used to indicate that the called terminal is in the power saving state and cannot be paged by the base station. If the call server corresponding to the called terminal receives, after the timer starts timing and before preset call waiting duration elapses, the addressing information of the called terminal sent by the mobility management entity, the call server corresponding to the called terminal sends a second call request to the calling terminal and the called terminal. If the paging response message is still not received after the preset call waiting duration of the timer elapses, the call server corresponding to the called terminal does not perform a call waiting process any longer, that is, the call server corresponding to the called terminal does not keep waiting for the called terminal to be paged. This reduces system power consumption of the call server. The preset call waiting duration may be set, by default, by the call server corresponding to the called terminal. For example, the preset call waiting duration is 30 s.

Optionally, the paging response message may carry duration required for waking up the called terminal from the power saving state. The call server may set the preset call waiting duration according to the duration required for waking up the called terminal from the power saving state, and set the preset call waiting duration to be greater than or equal to the duration required for waking up the called terminal from the power saving state. This ensures that the called terminal can be paged after call waiting timing is started and before the preset call waiting duration elapses, and therefore prevents the called terminal from missing a call.

Optionally, power saving duration of the power saving state (that is, duration of a sleep state) of the called terminal is greater than preset power saving duration. The preset power saving duration is maximum power saving duration of a called terminal in a conventional technology. The power saving duration of the called terminal may be set to be greater than the power saving duration in the conventional technology such that more power is saved. In addition, after the power saving duration of the called terminal is set to be greater, if a call processing process in the conventional technology is used, the called terminal misses a relatively large quantity of calls. According to a call waiting processing process in this solution, the called terminal can be prevented from missing a call. For example, the power saving duration in the conventional technology usually does not exceed 1280 milliseconds (ms). The power saving duration used for the called terminal in the present disclosure may be set to be greater than 1280 ms to achieve a better power saving effect. Optionally, when a current moment is in a preset call time period, the called terminal sets the power saving duration of the called terminal to first preset duration, when determining that a current moment is in a preset data access time period, the called terminal sets the power saving duration of the called terminal to second preset duration. The first preset duration is shorter than the second preset duration. In addition, the first preset duration and the second preset duration may be set by the terminal by default, or may be manually set by the terminal user. This is not limited in this embodiment of the present. The preset call time period and the preset data access time period may be manually set by the terminal user, or may be determined through intelligent analysis by the terminal. This is not limited in this embodiment of the present disclosure.

The called terminal may collect call records and network access records of the user, and perform analysis and statistics collection according to usage habits of the user, to determine a main call time period and a main network access time period of the user. When the called terminal determines that a current moment is in a call-dominated time period, the called terminal sets the power saving duration of the called terminal to the power saving duration in the conventional technology such that the mobile phone can be normally paged and no call is missed due to power saving. When a current moment is in a data access-dominated time period, the called terminal sets the power saving duration of the called terminal to power saving duration longer than the power saving duration in the conventional technology to achieve a better power saving effect. In addition, the called terminal may further send power saving duration of the called terminal in different time periods to the base station such that the called terminal can be paged.

If the called terminal is a dual SIM dual standby terminal, usually, a primary SIM card is used as a call card, and a secondary SIM card is used as a data access card. In this case, the called terminal may set power saving duration corresponding to the call card to the power saving duration in the conventional technology, and set power saving duration corresponding to the data access card to power saving duration longer than the power saving duration in the conventional technology in order to save power better.

There are two existing methods for implementing the dual SIM dual standby terminal. In a first method, one communications chip is used on hardware, and one control chip implements continuous switching between two networks using software, to automatically search for a network. In a second method, two communications chips are used on hardware, one communications chip is used for the primary SIM card, and one communications chip is used for the secondary SIM card.

For the first implementation of dual SIM dual standby, a method for adjusting the power saving duration by the called terminal is as follows.

The called terminal collects terminal usage habits of the user, sets, as the primary SIM card, a card that the user uses mainly for a call service, sets, as the secondary SIM card, a card that the user uses mainly for data access, determines a communications chip corresponding to the primary SIM card and a communications chip corresponding to the secondary SIM card, sets, to the power saving duration in the conventional technology, power saving duration of the communications chip corresponding to the primary SIM card, and sets, to power saving duration longer than the power saving duration in the conventional technology, power saving duration of the communications chip corresponding to the secondary SIM card.

If the primary SIM card and the secondary SIM card share one communications chip, a main time during which the user uses the primary SIM card is determined, and power saving duration of the communications chip in this time period is set to the power saving duration in the conventional technology such that the mobile phone can be normally paged and does not miss a call due to power saving. A main time during which the user uses the secondary SIM card is determined, and power saving duration of the communications chip in this time period is set to power saving duration longer than the power saving duration in the conventional technology.

By performing the foregoing steps, the call server performs call waiting when the call server receives the first call request of the calling terminal for the called terminal and learns that the called terminal is in the power saving state and therefore cannot be paged by the base station, or the call server performs call waiting when determining that the preset condition is met. If learning about the addressing information of the called terminal in the call waiting process, the call server can determine that the called terminal is paged by the base station, and therefore can establish the session connection between the calling terminal and the called terminal. This avoids a problem that the called terminal misses a call because the called terminal is in the power saving state.

To better implement the call processing method in the embodiments of the present disclosure, the present disclosure further provides a related device configured to implement the foregoing method.

Figure 4:
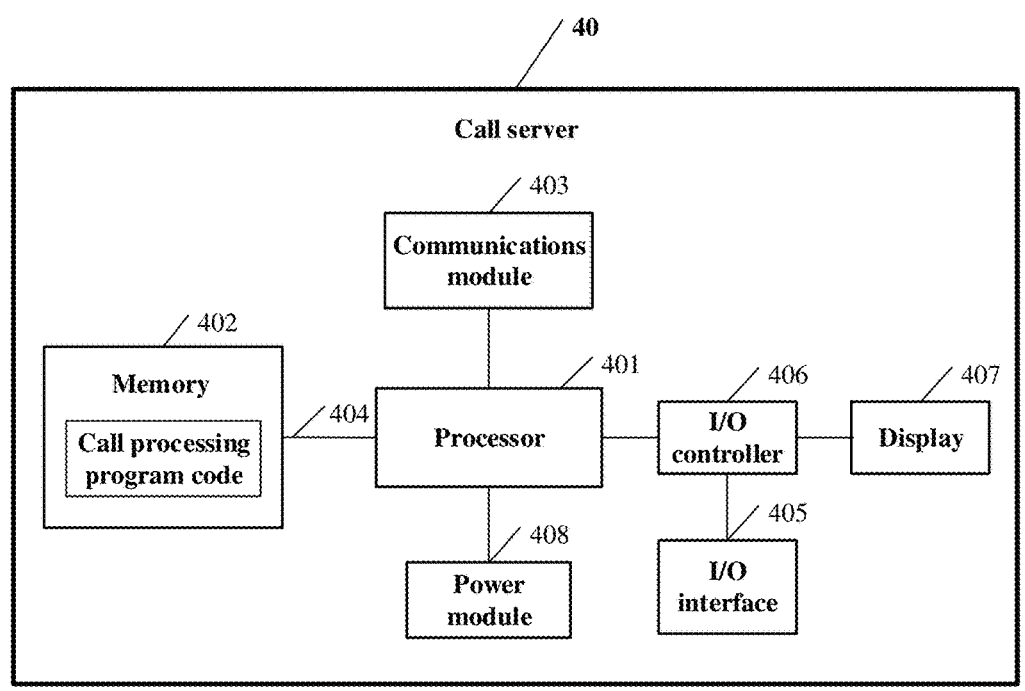
FIG. 4 is a schematic structural diagram of a call server according to an embodiment of the present disclosure.

Referring to FIG. 4, FIG. 4 is a schematic structural diagram of a call server 40 according to an embodiment of the present disclosure. As shown in FIG. 4, the call server 40 includes a processor 401, a memory 402, a communications module 403, and a bus 404, where the processor 401, the memory 402, and the communications module 403 may be connected using a bus or in another manner. In FIG. 4, for example, connection is implemented using the bus 404.

Optionally, the call server 40 may further include an input/output (I/O) interface 405, an I/O controller 406, a display 407, and a power module 408.

The processor 401 may be a general processor, for example, a central processing unit (CPU), and is configured to run operating system software of the call server 40 and required application program software. The processor 401 may process data received using the communications module 403. The processor 401 may further process data that is sent to the communications module 403 for wired transmission.

The memory 402 is configured to store program code of call processing, and transmit the program code to the processor 401. The processor 401 performs the foregoing call processing method shown in FIG. 3A. The memory 402 is further configured to store the preset call waiting duration described in the foregoing call processing method embodiment. The memory 402 may include a volatile memory, for example, a random access memory (RAM). The memory 402 may also include a nonvolatile memory, for example, a read-only memory (ROM), a hard disk, or a solid state drive. The memory 402 may further include a combination of the foregoing types of memories.

The communications module 403 is configured to provide the call server 40 with a communication function, for example, IMS-related call protocol processing signaling transmission, and exchange of signaling related to the call processing method provided in the present disclosure, usually in a wired transmission manner.

The bus 404 may be an Industry Standard Architecture (ISA) bus, a Peripheral Component Interconnect (PCI) bus, an Extended ISA (EISA) bus, an integrated circuit bus (IIC bus), or the like.

The I/O interface 405 is an external interface of the call server 40, and includes one or more of a Universal Serial Bus (USB) interface, a secure digital (SD) card interface, a key interface, or the like.

The I/O controller 406 is configured to control data interaction between various I/O devices, especially including data interaction between the processor 401, the I/O interface 405, and the display 407.

The display 407 is a display of the call server 40. The display is configured to display a software running status of the device, a user configuration screen, a configuration result, and the like.

The power module 408 is configured to supply power for each module of the call server 40.

In this embodiment of the present disclosure, the processor 401 is configured to invoke data or an instruction stored in the memory 402, to perform the following operations of receiving, by the processor 401 using the communications module 403, a first call request of a calling terminal for a called terminal, triggering, by the processor 401 according to the first call request, a mobility management entity to control a base station to page the called terminal, if a paging response message that is sent by the mobility management entity and that is used to indicate that the called terminal is in a power saving state and cannot be paged by the base station is received, performing, by the processor 401, call waiting according to the paging response message, or determining, by the processor 401 according to the paging response message, whether a preset condition is met, and performing call waiting if the preset condition is met, and if addressing information of the called terminal sent by the mobility management entity is received in a call waiting process, establishing, by the processor 401, a session connection between the calling terminal and the called terminal according to the addressing information, where the addressing information is used to indicate that the called terminal is woken up from the power saving state and is paged by the base station.

By performing the foregoing operations, the call server 40 performs call waiting when the call server 40 receives the first call request of the calling terminal for the called terminal and learns that the called terminal is in the power saving state and therefore cannot be paged by the base station, or the call server 40 performs call waiting when the preset condition is met. If learning about the addressing information of the called terminal in the call waiting process, the call server 40 can determine that the called terminal is paged by the base station, and therefore can establish the session connection between the calling terminal and the called terminal. This avoids a problem that the called terminal misses a call because the called terminal is in the power saving state.

Optionally, performing, by the processor 401, call waiting includes starting, by the processor 401, call waiting timing, and the if addressing information of the called terminal sent by the mobility management entity is received in a call waiting process, establishing, by the processor 401, a session connection between the calling terminal and the called terminal according to the addressing information includes, if the addressing information of the called terminal sent by the mobility management entity is received after call waiting timing is started and before preset call waiting duration elapses, establishing, by the processor 401, the session connection between the calling terminal and the called terminal according to the addressing information.

By performing the foregoing operations, the call server 40 starts call waiting timing when learning that the called terminal is in the power saving state and therefore cannot be paged by the base station, and if receiving the addressing information of the called terminal after call waiting timing is started and before the preset call waiting duration elapses, the call server 40 establishes the session connection between the calling terminal and the called terminal according to the addressing information, instead of keeping waiting for the called terminal to be paged by the base station. This reduces system power consumption of the call server 40.

Optionally, before the processor 401 establishes the session connection between the calling terminal and the called terminal according to the addressing information, the processor 401 is further configured to receive the paging response message that is sent by the mobility management entity and that is used to indicate that the called terminal is in the power saving state and cannot be paged by the base station, and send a call waiting instruction message to the calling terminal using the communications module 403, where the call waiting instruction message is used to instruct the calling terminal to perform call waiting.

Establishing, by the processor 401, a session connection between the calling terminal and the called terminal according to the addressing information includes sending, by the processor 401 using the communications module 403, the first call request to the called terminal according to the addressing information, where the first call request is used to instruct to establish the session connection between the calling terminal and the called terminal.

By performing the foregoing operations, when the call server 40 learns that the called terminal is in the power saving state and therefore cannot be paged by the base station, the call server 40 sends the call waiting instruction message to the calling terminal to trigger the calling terminal to perform the call waiting process, and sends the first call request to the called terminal after receiving the addressing information of the called terminal. This avoids a problem that the called terminal misses a call when the called terminal is in the power saving state.

Optionally, before the processor 401 establishes the session connection between the calling terminal and the called terminal according to the addressing information, the processor 401 is further configured to receive the paging response message that is sent by the mobility management entity and that is used to indicate that the called terminal is in the power saving state and cannot be paged by the base station, terminate a current call, and record information about the current call.

Establishing, by the processor 401, a session connection between the calling terminal and the called terminal according to the addressing information includes sending, by the processor 401, a second call request to the calling terminal and the called terminal according to the addressing information, where the second call request is used to instruct to establish the session connection between the calling terminal and the called terminal.

By performing the foregoing operations, when the call server 40 learns that the called terminal is in the power saving state and therefore cannot be paged by the base station, the call server 40 terminates the current call to prevent the calling terminal from keeping waiting for the called terminal to be paged. In addition, the call server performs call waiting, and when receiving the addressing information of the called terminal in the call waiting process, sends the second call request to the calling terminal and the called terminal to establish the session connection between the calling terminal and the called terminal. This avoids a problem that the called terminal misses a call when the called terminal is in the power saving state.

It should be noted that a function of each function module of the call server 40 described in this embodiment of the present disclosure may be further implemented according to the call processing method in the embodiment shown in FIG. 3A. Details are not described herein again.

Figure 5:
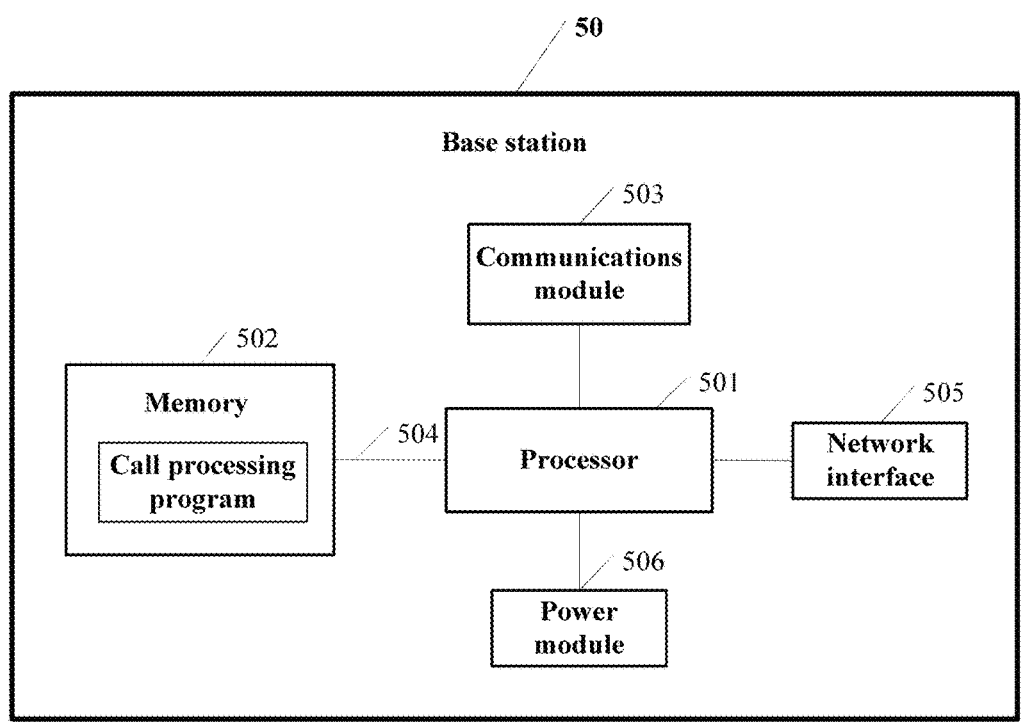
FIG. 5 is a schematic structural diagram of a base station according to an embodiment of the present disclosure.

Referring to FIG. 5, FIG. 5 is a schematic structural diagram of a base station 50 according to an embodiment of the present disclosure. As shown in FIG. 5, the base station 50 includes a processor 501, a memory 502, a communications module 503, and a bus 504, where the processor 501, the memory 502, and the communications module 503 may be connected using a bus or in another manner. In FIG. 5, for example, connection is implemented using the bus 504.

Optionally, the base station 50 may further include a network interface 505 and a power module 506.

The processor 501 may be a digital signal processing (DSP) chip. The processor 501 is configured to perform radio channel management, implement call and communication link setup and release, and control handover of a terminal in a local control area. In specific implementation, the processor 501 may include modules such as an AM/CM module (used as a center of speech channel switching and information exchange), a BM module (configured to implement call processing, signaling processing, radio resource management, radio link management, and circuit maintenance functions), a TCSM module (configured to implement multiplexing, demultiplexing, and transcoding functions). For specific information, refer to knowledge related to mobile communications.

The memory 502 is configured to store program code of call processing. In specific implementation, the memory 502 may be a ROM or a RAM, and may be configured to store program code.

The communications module 503 is configured to perform transmission processing (for example, modulation) on a mobile communications signal generated by the processor 501, and is further configured to perform reception processing (for example, demodulation) on a mobile communications signal received by an antenna.

The bus 504 may be an ISA bus, a PCI bus, an EISA bus, an IIC bus, or the like.

The network interface 505 is used for data communication between the base station 50 and a terminal (an MS in 2G or UE in 3G or 4G). In specific implementation, the network interface 505 may include one or more of a GSM (2G) wireless network interface, a WCDMA (3G) wireless network interface, an LTE (4G) wireless network interface, or the like, or may be a future 4.5G or 5G wireless network interface.

The power module 506 is configured to supply power for each module of the base station 50.

In this embodiment of the present disclosure, the processor 501 is further configured to invoke the program code in the memory 502, to perform the following operations receiving, by the processor 501 using the communications module 503, a paging message that is sent by a mobility management entity and that is used to instruct to page a called terminal, paging, by the processor 501, the called terminal according to the paging message, and if the called terminal is in a power saving state and cannot be paged by the base station, sending, by the processor 501 to the mobility management entity using the communications module 503, a paging response message used to indicate that the called terminal is in the power saving state and cannot be paged by the base station, and continuously paging, by the processor 501, the called terminal, and if it is determined, in a continuous paging process, that the called terminal is woken up from the power saving state, triggering the mobility management entity to send addressing information of the called terminal to a call server, where the addressing information is used to indicate that the called terminal is woken up from the power saving state and is paged by the base station.

By performing the foregoing operations, when the base station 50 determines, when paging the called terminal, that the called terminal is in the power saving state and therefore cannot be paged by the base station, the base station 50 sends, to the mobility management entity, the paging response message used to indicate that the called terminal is in the power saving state and cannot be paged. In addition, the base station 50 continuously pages the called terminal. When subsequently determining that the called terminal is paged, the base station 50 triggers the mobility management entity to send the addressing information of the called terminal to the call server to notify the call server to establish a session connection between a calling terminal and the called terminal. This prevents the called terminal from missing a call.

It should be noted that the base station 50 may be applicable to a 2G communications system (for example, GSM), a 3G communications system (for example, UMTS), a 4G communications system (LTE), and a future 4.5G or 5G communications system.

It should be noted that a function of each function module of the base station 50 described in this embodiment of the present disclosure may be implemented according to the method corresponding to the base station in the embodiment shown in FIG. 3A. Details are not described herein again.

Figure 6:
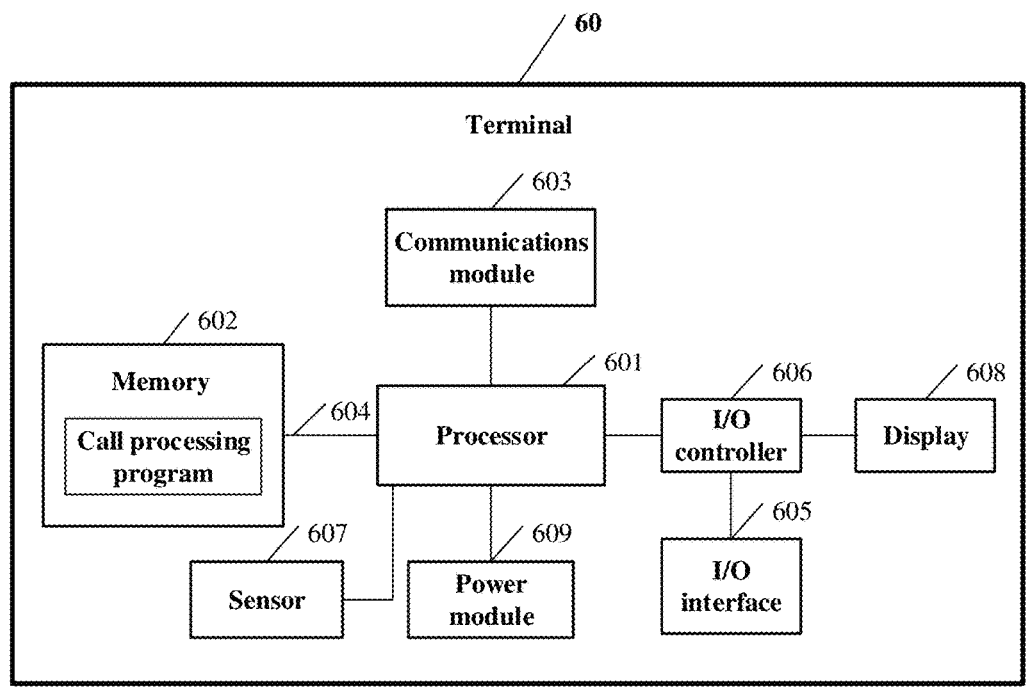
FIG. 6 is a schematic structural diagram of a terminal according to an embodiment of the present disclosure.

Referring to FIG. 6, FIG. 6 is a schematic structural diagram of a terminal 60 according to an embodiment of the present disclosure. As shown in FIG. 6, the terminal 60 includes a processor 601 having one or more processing cores, a memory 602 storing one or more computer programs, a communications module 603, and a bus 604, where the processor 601, the memory 602, and the communications module 603 may be connected using a bus or in another manner. In FIG. 6, for example, connection is implemented using the bus 604. A person skilled in the art may understand that a terminal structure shown in FIG. 6 does not constitute any limitation on the terminal 60, and the terminal 60 may include parts more or fewer than those shown in the figure, or a combination of some parts, or parts disposed differently.

Optionally, the terminal 60 may further include an I/O interface 605, an I/O controller 606, a sensor 607, a display 608, and a power module 609.

The processor 601 may be a CPU, and is configured to run operating system software of the terminal and required application program software. The processor 601 is a control center of the terminal 60. The processor 601 uses various interfaces and lines to connect all parts of the entire terminal 60, and performs various functions of the terminal 60 and processes data by running or executing the computer program and/or a module stored in the memory 602 and by invoking data stored in the memory 602 in order to perform overall monitoring on the terminal 60. Optionally, the processor 601 may include one or more processing cores. The processor 601 may integrate an application processor and a modem processor. The application processor mainly processes an operating system, a user interface, an application program, and the like. The modem processor mainly processes wireless communication. It can be understood that, alternatively, the modem processor may not be integrated into the processor 601.

The memory 602 may be configured to store a call processing program and module. The processor 601 executes various function applications and processes data by running the computer program and the module stored in the memory 602. The memory 602 may mainly include a program storage area and a data storage area. The program storage area may store an operating system, an application program required by at least one function (for example, a voice playback function or a picture playback function), and the like. The data storage area may store data (for example, a photograph, audio data, and video data) and the like created according to usage of the terminal 60. In addition, the memory 602 may be one or more of a RAM, a ROM, a solid state drive (SSD), or a hard disk drive (HDD).

The communications module 603 provides a communication function for the terminal 60, and may be configured to receive and send signals during information reception and sending or during a call, and particularly, receive downlink information from a base station and then send the downlink information to one or more processors 601 for processing. In addition, the communications module 603 sends uplink data to the base station. Usually, the communications module 603 includes but is not limited to an antenna, at least one amplifier, a tuner, one or more oscillators, an SIM card, a transceiver, a coupler, a low noise amplifier (LNA), a duplexer, and the like. In addition, the communications module 603 may further communicate with a network and another terminal device through wireless communication. The wireless communication may be implemented using any communications standard or protocol, including but not limited to GSM, GPRS, CDMA, WCDMA, LTE, email, short message service (SMS), and the like.

The bus 604 may be an ISA bus, a PCI bus, an EISA bus, an IIC bus, or the like.

The I/O interface 605 is an external interface of the terminal 60, and includes one or more of a USB interface, an SD card interface, a key interface, or the like.

In the terminal 60, the I/O controller 606 is configured to control data interaction between various input/output devices, especially including data interaction between the processor 601, the I/O interface 605, and the display 608.

The sensor 607 is various sensor devices, including one or more of an optical sensor, a Global Positioning System (GPS) module, a gravity sensor, an acceleration sensor, a distance sensor, a camera, or the like. Further, the optical sensor may include an ambient light sensor. The ambient light sensor may adjust luminance of the display 608 according to brightness of ambient light. As a type of motion sensor, the accelerometer sensor may detect magnitudes of acceleration in various directions (usually including three axes), may detect, in a still state, a magnitude and a direction of gravity, and may be used for an application identifying a posture of the terminal 60 (for example, screen switch between a portrait mode and a landscape mode, a related game, and magnetometer posture calibration), a vibration identification-related function (for example, a pedometer or tapping), and the like. For other sensors that may further be configured on the terminal 60, such as a gyroscope, a barometer, a hygrometer, a thermometer, and an infrared sensor, details are not described herein.

The display 608 is a display screen and a touchscreen of the terminal 60. The display 608 is configured to display a software running status, a battery level status, time, a user configuration screen, and a configuration result of the terminal 60. The touchscreen is configured to receive a user touch operation and convert the operation into a user operation instruction.

The power module 609 is configured to supply power for each module of the terminal 60. The power module 609 may be logically connected to the processor 601 using a power management system in order to implement functions such as charge management, discharge management, and power consumption management using the power management system. The power module 609 may further include one or more direct current (DC) or alternating current (AC) power supplies, a re-charge system, a power supply failure detection circuit, a power converter or inverter, a power supply status indicator, and any other component.

Although not shown in FIG. 6, an audio frequency circuit, a loudspeaker, and a microphone may be further included in the terminal 60 to provide an audio interface between a user and the terminal 60. The audio frequency circuit may transmit, to the loudspeaker, an electrical signal converted from received audio data. The loudspeaker converts the electrical signal into an audio signal and outputs the audio signal. In addition, the microphone converts a collected audio signal into an electrical signal, and the audio frequency circuit receives the electrical signal, converts the electrical signal into audio data, and outputs the audio data to the processor 601 for processing. After processing, the audio data is sent to, for example, another terminal device using the communications module 603, or the audio data is output to the memory 602 for further processing. The audio frequency circuit possibly further includes an earphone jack to provide communication between a peripheral earphone and the terminal 60. The terminal 60 may further include a camera, a BLUETOOTH module, and the like, and details are not described herein.

In this embodiment of the present disclosure, the processor 601 is mainly configured to invoke the program stored in the memory 602 to perform the following operations of determining, by the processor 601, whether a current moment is in a preset call time period or a preset data access time period, and setting, by the processor 601, power saving duration of a power saving state to first preset duration if the current moment is in the preset call time period, or setting, by the processor 601, power saving duration of a power saving state to second preset duration if the current moment is in the preset data access time period, where the first preset duration is shorter than the second preset duration.

The foregoing operations can ensure that the terminal 60 implements better power saving without missing a call.

It should be noted that a function of each function module of the terminal 60 described in this embodiment of the present disclosure may be implemented according to the method corresponding to the called terminal in the embodiment shown in FIG. 3A. Details are not described herein again.

Figure 7:
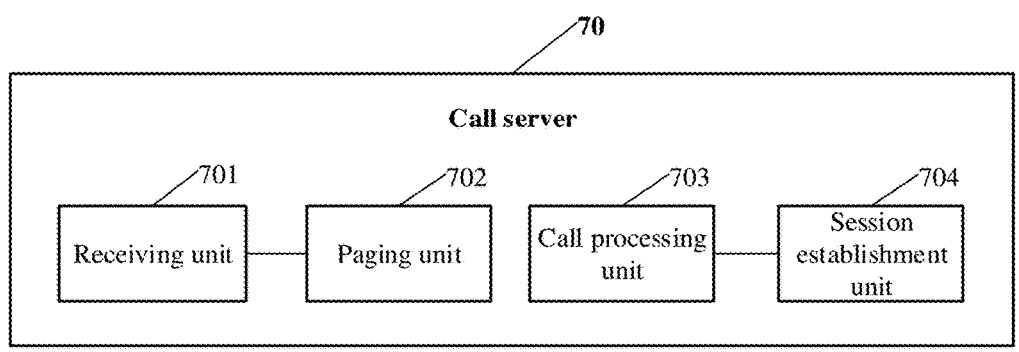
FIG. 7 is a schematic structural diagram of another call server according to an embodiment of the present disclosure.

Referring to FIG. 7, FIG. 7 is a schematic structural diagram of another call server 70 according to an embodiment of the present disclosure. As shown in FIG. 7, the call server 70 includes a receiving unit 701, a paging unit 702, a call processing unit 703, and a session establishment unit 704.

The receiving unit 701 is configured to receive a first call request of a calling terminal for a called terminal.

The paging unit 702 is configured to trigger, according to the first call request, a mobility management entity to control a base station to page the called terminal.

The call processing unit 703 is configured to, if a paging response message that is sent by the mobility management entity and that is used to indicate that the called terminal is in a power saving state and cannot be paged by the base station is received, perform call waiting according to the paging response message, or determine, according to the paging response message, whether a preset condition is met, and perform call waiting if the preset condition is met.

The session establishment unit 704 is configured to, if addressing information of the called terminal sent by the mobility management entity is received in a call waiting process, establish a session connection between the calling terminal and the called terminal according to the addressing information, where the addressing information is used to indicate that the called terminal is woken up from the power saving state and is paged by the base station.

By running the foregoing units, the call server 70 performs call waiting when the call server 70 receives the first call request of the calling terminal for the called terminal and learns that the called terminal is in the power saving state and therefore cannot be paged by the base station, or the call server 70 performs call waiting when the preset condition is met. If learning about the addressing information of the called terminal in the call waiting process, the call server 70 can determine that the called terminal is paged by the base station, and therefore can establish the session connection between the calling terminal and the called terminal. This avoids a problem that the called terminal misses a call because the called terminal is in the power saving state.

In this embodiment, the call server 70 is presented in a form of a functional unit. The "unit" herein may be an application-specific integrated circuit (ASIC), a processor executing one or more software or firmware programs, a memory, an integrated logical circuit, and/or another device that can provide the foregoing functions. The call server 70 may be in a form shown in FIG. 4. The receiving unit 701, the paging unit 702, the call processing unit 703, and the session establishment unit 704 may be implemented using the processor 401 in FIG. 4.

Optionally, the call processing unit 703 is configured to start call waiting timing.

The session establishment unit 704 is further configured to, if the addressing information of the called terminal sent by the mobility management entity is received after the call processing unit 703 starts timing and before preset call waiting duration elapses, establish the session connection between the calling terminal and the called terminal according to the addressing information.

By running the foregoing units, the call server 70 starts call waiting timing when learning that the called terminal is in the power saving state and therefore cannot be paged by the base station, and if receiving the addressing information of the called terminal after call waiting timing is started and before the preset call waiting duration elapses, the call server establishes the session connection between the calling terminal and the called terminal according to the addressing information, instead of keeping waiting for the called terminal to be paged by the base station. This reduces system power consumption of the call server.

Optionally, the call server 70 further includes a sending unit (not shown) configured to send a call waiting instruction message to the calling terminal if the call server 70 receives the paging response message that is sent by the mobility management entity and that is used to indicate that the called terminal is in the power saving state and cannot be paged by the base station, where the call waiting instruction message is used to instruct the calling terminal to perform call waiting.

The session establishment unit 704 is further configured to send the first call request to the called terminal according to the addressing information, where the first call request is used to instruct to establish the session connection between the calling terminal and the called terminal.

By running the foregoing units, when the call server 70 learns that the called terminal is in the power saving state and therefore cannot be paged by the base station, the call server 70 sends the call waiting instruction message to the calling terminal to trigger the calling terminal to perform the call waiting process, and sends the first call request to the called terminal after receiving the addressing information of the called terminal. This avoids a problem that the called terminal misses a call when the called terminal is in the power saving state.

Optionally, the call server 70 further includes a recording unit (not shown) configured to, if the call server 70 receives the paging response message that is sent by the mobility management entity and that is used to indicate that the called terminal is in the power saving state and cannot be paged by the base station, terminate a current call, and record information about the current call.

The session establishment unit 704 is further configured to send a second call request to the calling terminal and the called terminal according to the addressing information, where the second call request is used to instruct to establish the session connection between the calling terminal and the called terminal.

By running the foregoing units, when the call server 70 learns that the called terminal is in the power saving state and therefore cannot be paged by the base station, the call server 70 terminates the current call to prevent the calling terminal from keeping waiting for the called terminal to be paged. In addition, the call server 70 performs call waiting, and when receiving the addressing information of the called terminal in the call waiting process, sends the second call request to the calling terminal and the called terminal to establish the session connection between the calling terminal and the called terminal. This avoids a problem that the called terminal misses a call when the called terminal is in the power saving state.

It should be noted that a function of each functional unit of the call server 70 described in this embodiment of the present disclosure may be implemented according to related descriptions of the call server in the embodiment shown in FIG. 3A. Details are not described herein again.

Figure 8:
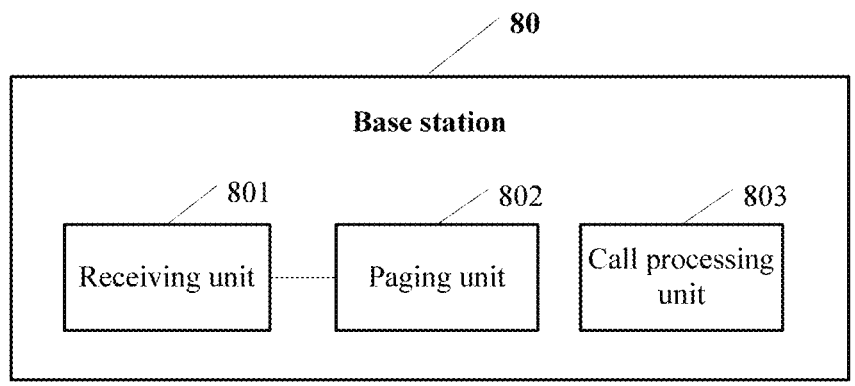
FIG. 8 is a schematic structural diagram of another base station according to an embodiment of the present disclosure.

Referring to FIG. 8, FIG. 8 is a schematic structural diagram of another base station 80 according to an embodiment of the present disclosure. As shown in FIG. 8, the base station 80 includes a receiving unit 801, a paging unit 802, and a call processing unit 803.

The receiving unit 801 is configured to receive a first paging message that is sent by a mobility management entity and that is used to instruct to page a called terminal.

The paging unit 802 is configured to page the called terminal according to the first paging message, and if the called terminal is in a power saving state and cannot be paged by the base station, send, to the mobility management entity, a paging response message used to indicate that the called terminal is in the power saving state and cannot be paged by the base station.

The call processing unit 803 is configured to continuously page the called terminal, and if it is determined, in a continuous paging process, that the called terminal is woken up from the power saving state, trigger the mobility management entity to send addressing information of the called terminal to a call server, where the addressing information is used to indicate that the called terminal is woken up from the power saving state and is paged by the base station.

By running the foregoing units, when the base station 80 determines, when paging the called terminal, that the called terminal is in the power saving state and therefore cannot be paged by the base station, the base station 80 sends, to the mobility management entity, the paging response message used to indicate that the called terminal is in the power saving state and cannot be paged. In addition, the base station 80 continuously pages the called terminal. When subsequently determining that the called terminal is paged, the base station 80 triggers the mobility management entity to send the addressing information of the called terminal to the call server to notify the call server to establish a session connection between a calling terminal and the called terminal. This prevents the called terminal from missing a call.

In this embodiment, the base station 80 is presented in a form of a functional unit. The "unit" herein may be an ASIC, a processor executing one or more software or firmware programs, a memory, an integrated logical circuit, and/or another device that can provide the foregoing functions. The base station 80 may be in a form shown in FIG. 5. The receiving unit 801, the paging unit 802, and the call processing unit 803 may be implemented using the processor 501 in FIG. 5.

It should be noted that a function of each functional unit of the base station 80 described in this embodiment of the present disclosure may be implemented according to related descriptions of the base station in the embodiment shown in FIG. 3A. Details are not described herein again.

Figure 9:
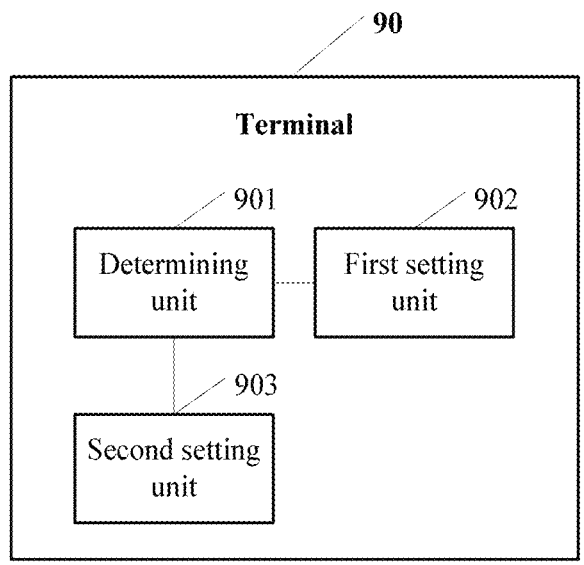
FIG. 9 is a schematic structural diagram of another terminal according to an embodiment of the present disclosure.

Referring to FIG. 9, FIG. 9 is a schematic structural diagram of another terminal 90 according to an embodiment of the present disclosure. As shown in FIG. 9, the terminal 90 includes a determining unit 901, a first setting unit 902, and a second setting unit 903.

The determining unit 901 is configured to determine whether a current moment is in a preset call time period or a preset data access time period.

The first setting unit 902 is configured to set power saving duration of a power saving state to first preset duration if the determining unit 901 determines that the current moment is in the preset call time period.

The second setting unit 903 is configured to set power saving duration of a power saving state to second preset duration if the determining unit 901 determines that the current moment is in the preset data access time period, where the first preset duration is shorter than the second preset duration.

By running the foregoing units, it can be ensured that the terminal 90 implements better power saving without missing a call.

In this embodiment, the terminal 90 is presented in a form of a functional unit. The "unit" herein may be an ASIC, a processor executing one or more software or firmware programs, a memory, an integrated logical circuit, and/or another device that can provide the foregoing functions. The terminal 90 may be in a form shown in FIG. 6. The determining unit 901, the first setting unit 902, and the second setting unit 903 may be implemented using the processor 601 in FIG. 6.

It should be noted that a function of each functional unit of the terminal 90 described in this embodiment of the present disclosure may be implemented according to related descriptions of the called terminal in the embodiment shown in FIG. 3A. Details are not described herein again.

To better implement the embodiments of the present disclosure, the embodiments of the present disclosure further provide a computer readable storage medium. The computer readable storage medium stores one or more computer programs. The computer readable storage medium may be a magnetic disk, an optical disc, a ROM, a RAM, or the like. The one or more computer programs run on one or more processors of the call server or the base station. When the computer program runs, the process of the method embodiment shown in FIG. 3A can be implemented.

To sum up, according to the embodiments of the present disclosure, the call server performs call waiting when the call server receives the first call request of the calling terminal for the called terminal and learns that the called terminal is in the power saving state and therefore cannot be paged by the base station, or the call server performs call waiting when determining that the preset condition is met. If learning about the addressing information of the called terminal in the call waiting process, the call server can determine that the called terminal is paged by the base station, and therefore can establish the session connection between the calling terminal and the called terminal. This avoids a problem that the called terminal misses a call because the called terminal is in the power saving state.

Although the present disclosure is described herein with reference to the embodiments, a scope of the claims of the present disclosure shall not be limited thereto. In a process of implementing the present disclosure that claims protection, a person skilled in the art may understand and implement all or a part of the processes in the foregoing embodiments by viewing the accompanying drawings, the disclosed content, and the accompanying claims. Equivalent modifications made in accordance with the claims of the present disclosure still fall within the scope of the present disclosure. In the claims, the word "comprise" does not exclude another component or step, and "a" or "one" does not exclude a case of plurality. A single controller or another unit may implement several functions enumerated in the claims. Some expressions are recorded in dependence claims that are different from each other, but this does not indicate that these expressions cannot be combined to produce a good effect. The computer program may be stored/distributed in a proper medium, for example, an optical storage medium or a solid-state medium, and be provided together with other hardware or be used as a part of hardware, or may be distributed in another manner, for example, using the Internet or another wired or wireless system.

What is claimed is:

1. A call processing method, comprising:
   receiving, by a call server, a first call request of a calling terminal for a called terminal;
   triggering, by the call server according to the first call request, a mobility management entity to control a base station to page the called terminal;
   performing, by the call server, call waiting according to a paging response message when receiving the paging response message from the mobility management entity indicating that the called terminal is in a power saving state and cannot be paged by the base station; and
   establishing, by the call server, a session coupling between the calling terminal and the called terminal according to addressing information of the called terminal when receiving, in a call waiting process, the addressing information of the called terminal from the mobility management entity, the addressing information indicating that the called terminal is woken up from the power saving state and is paged by the base station.

2. The method of claim 1, wherein performing the call waiting comprises:
   performing, by the call server when a preset condition is met according to the paging response message, the call waiting when the preset condition is met.

3. The method of claim 2, wherein the preset condition comprises a quantity of calls originated by the calling terminal to the called terminal in a preset time period reaches a preset call quantity threshold.

4. The method of claim 2, wherein the preset condition comprises a message from the calling terminal instructing to perform the call waiting is received.

5. The method of claim 2, wherein the preset condition comprises the called terminal subscribes to a call waiting service in advance.

6. The method of claim 2, wherein the preset condition comprises the calling terminal subscribes to a call waiting service in advance.

7. The method of claim 1, wherein performing the call waiting comprises starting, by the call server, call waiting timing, and establishing the session coupling between the calling terminal and the called terminal comprising establishing, by the call server, the session coupling between the calling terminal and the called terminal according to the addressing information of the called terminal when receiving the addressing information of the called terminal from the mobility management entity after the call waiting timing is started and before preset call waiting duration elapses.

8. The method of claim 1, wherein performing the call waiting comprises sending a call waiting instruction message to the calling terminal, the call waiting instruction message instructing the calling terminal to perform the call waiting, establishing the session coupling between the calling terminal and the called terminal comprising sending, by the call server, the first call request to the called terminal according to the addressing information of the called terminal, and the first call request instructing to establish the session coupling between the calling terminal and the called terminal.

9. The method of claim 1, wherein performing the call waiting comprises:
   sending, by the call server, an instruction message instructing to terminate a current call request to the calling terminal;
   terminating, by the call server, a current call; and
   recording, by the call server, information about the current call, and
   establishing the session coupling between the calling terminal and the called terminal comprising sending, by the call server, a second call request instructing to establish the session coupling between the calling terminal and the called terminal to the calling terminal and the called terminal according to the addressing information of the called terminal.

10. A call processing method, comprising:
    receiving, by a base station, a paging message from a mobility management entity instructing to page a called terminal;
    paging, by the base station, the called terminal according to the paging message;
    sending, by the base station to the mobility management entity, a paging response message indicating that the called terminal is in a power saving state and cannot be paged by the base station when the called terminal is in the power saving state and cannot be paged by the base station;
    continuously paging, by the base station, the called terminal; and
    triggering, by the base station, the mobility management entity to send addressing information of the called terminal to a call server when it is determined, in a continuous paging process, the called terminal is woken up from the power saving state, the addressing information of the called terminal indicating that the called terminal is woken up from the power saving state and is paged by the base station.

11. A call server, comprising:
    a receiver configured to receive a first call request of a calling terminal for a called terminal;

a non-transitory computer-readable storage medium coupled to the receiver and configured to store programming instructions; and at least one processor coupled to the receiver and the non-transitory computer-readable storage medium, the programming instructions causing the at least one processor to be configured to:
  trigger according to the first call request, a mobility management entity to control a base station to page the called terminal;
  perform call waiting according to a paging response message when the paging response message from the mobility management entity indicating that the called terminal is in a power saving state and cannot be paged by the base station is received; and
  establish a session coupling between the calling terminal and the called terminal according to addressing information of the called terminal when the addressing information of the called terminal from the mobility management entity is received in a call waiting process, the addressing information of the called terminal indicating that the called terminal is woken up from the power saving state and is paged by the base station.

12. The call server of claim 11, wherein the programming instructions further cause the at least one processor to be configured to:
  determine whether a preset condition is met according to the paging response message; and
  perform the call waiting when the preset condition is met.

13. The call server of claim 12, wherein the preset condition comprises a quantity of calls originated by the calling terminal to the called terminal in a preset time period reaches a preset call quantity threshold.

14. The call server of claim 12, wherein the preset condition comprises a message from the calling terminal instructing to perform the call waiting is received.

15. The call server of claim 12, wherein the preset condition comprises the called terminal subscribes to a call waiting service in advance.

16. The call server of claim 12, wherein the preset condition comprises the calling terminal subscribes to a call waiting service in advance.

17. The call server of claim 11, wherein the programming instructions further cause the at least one processor to be configured to:
  start call waiting timing; and
  establish the session coupling between the calling terminal and the called terminal according to the addressing information of the called terminal when the addressing information of the called terminal from the mobility management entity is received after the call waiting timing is started and before preset call waiting duration elapses.

18. The call server of claim 11, further comprising a transmitter coupled to the at least one processor and configured to:
  send a call waiting instruction message to the calling terminal when receiving the paging response message from the mobility management entity indicating that the called terminal is in the power saving state and cannot be paged by the base station, the call waiting instruction message instructing the calling terminal to perform the call waiting; and
  send the first call request to the called terminal according to the addressing information of the called terminal, the first call request instructing to establish the session coupling between the calling terminal and the called terminal.

19. The call server according to claim 11, further comprising a transmitter coupled to the at least one processor and configured to send an instruction message instructing to terminate a current call request to the calling terminal when receiving the paging response message from the mobility management entity indicating that the called terminal is in the power saving state and cannot be paged by the base station, the programming instructions further causing the at least one processor to be configured to:
  terminate a current call; and
  record information about the current call, and
  the transmitter being further configured to send a second call request to the calling terminal and the called terminal according to the addressing information of the called terminal, the second call request instructing to establish the session coupling between the calling terminal and the called terminal.

20. A base station, comprising:
a receiver configured to receive a paging message from a mobility management entity instructing to page a called terminal;
a non-transitory computer-readable storage medium coupled to the receiver and configured to store programming instructions;
at least one processor coupled to the receiver and the non-transitory computer-readable storage medium, the programming instructions causing the at least one processor to be configured to page the called terminal according to the paging message; and
a transmitter coupled to the at least one processor and configured to send a paging response message indicating that the called terminal is in a power saving state and cannot be paged by the base station to the mobility management entity when the called terminal is in the power saving state and cannot be paged by the base station, and
the programming instructions further causing the at least one processor to be configured to:
  continuously page the called terminal;
  trigger the mobility management entity to send addressing information of the called terminal to a call server when it is determined, in a continuous paging process, that the called terminal is woken up from the power saving state, the addressing information of the called terminal indicating that the called terminal is woken up from the power saving state and is paged by the base station.

* * * * *